(12) United States Patent
Oyama et al.

(10) Patent No.: US 8,374,664 B2
(45) Date of Patent: Feb. 12, 2013

(54) CONTAINER FOR SUPERCONDUCTING APPARATUS AND SUPERCONDUCTING APPARATUS

(75) Inventors: Hitoshi Oyama, Osaka (JP); Tsuyoshi Shinzato, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/148,532

(22) PCT Filed: Oct. 5, 2010

(86) PCT No.: PCT/JP2010/067403
§ 371 (c)(1),
(2), (4) Date: Aug. 9, 2011

(87) PCT Pub. No.: WO2011/046038
PCT Pub. Date: Apr. 21, 2011

(65) Prior Publication Data
US 2011/0319269 A1    Dec. 29, 2011

(30) Foreign Application Priority Data

Oct. 14, 2009  (JP) .................................. 2009-237309
Aug. 30, 2010  (JP) .................................. 2010-192004

(51) Int. Cl.
*H01F 6/06*  (2006.01)
(52) U.S. Cl. ...................................................... 505/163
(58) Field of Classification Search .................... 505/163
See application file for complete search history.

(56) References Cited

U.S. PATENT DOCUMENTS 4,486,676 A  * 12/1984  Moore et al. ..................... 310/52
7,174,197 B2 * 2/2007  Kai et al. ....................... 505/210

FOREIGN PATENT DOCUMENTS

| JP | 62-4161 | | 1/1987 |
| JP | 406061682 A | * | 3/1994 |
| JP | 2007-214546 | | 8/2007 |
| JP | 2008-218861 | | 9/2008 |
| JP | 2010-50314 | | 3/2010 |

* cited by examiner

*Primary Examiner* — Colleen Dunn
(74) *Attorney, Agent, or Firm* — Drinker Biddle & Reath LLP

(57) ABSTRACT

The invention offers a container for a superconducting apparatus and a superconducting apparatus. The container mounts in it a superconducting coil as a member including a superconductor. The container is provided with a vacuum insulated container 20 as a housing case made of resin and provided with an opening, a lead electrode 50 as a metal member positioned such that it passes through the opening, and a combination of connecting members 63 and 65 that covers the opening, that connects the lead electrode 50 to the vacuum insulated container 20, and that is provided with a curved portion as a thermal-stress-alleviating portion. Having the foregoing structure, the container can suppress the development of separation and cracks at the portion where the metal member passes though and is fixed to the wall of the container that mounts in it a superconductor such as a superconducting coil.

16 Claims, 7 Drawing Sheets

CONTAINER FOR SUPERCONDUCTING APPARATUS AND SUPERCONDUCTING APPARATUS

TECHNICAL FIELD

The present invention relates to a container for a superconducting apparatus and a superconducting apparatus, more specifically to a container for a superconducting apparatus, the container being provided with a connecting structure for connecting a superconducting wire to the outside, and a superconducting apparatus incorporating the foregoing container for a superconducting apparatus.

BACKGROUND ART

It is known that a superconducting wire having a higher critical temperature can be formed by using a Bi (bismuth)- or Y (yttrium)-based oxide superconducting material than by using a metallic superconducting material such as $Nb_3Sn$ (niobium-tin alloy). In consequence, in recent years, it has been expected that a superconducting wire formed by using an oxide superconducting material, in particular, is applied as a wire for an electromagnet and power transmission. As described above, the superconducting wire in recent years can be used at a considerably higher temperature than does the conventional superconducting wire. Nevertheless, a superconducting coil or the like that is formed by using the above-described superconducting wire and that is placed in a cryogenic environment obtained by using liquid nitrogen is required to be electrically connected to the outside load. To meet the above requirement, a structure is employed in which the superconducting coil is placed in a liquid nitrogen bath to be electrically connected to the outside load by using a metal member such as a lead electrode. A pipe for supplying the liquid nitrogen, which is a cooling medium, to the liquid nitrogen bath is connected to the liquid nitrogen bath that mounts in it the superconducting coil.

It is desirable that the liquid nitrogen bath be a vacuum insulated container in order to suppress heat from penetrating into the liquid nitrogen bath that houses the liquid nitrogen (and the superconducting coil) so that the inside of the liquid nitrogen bath can be maintained under a sufficiently cooled temperature condition for enabling the superconducting coil to function. In particular, a vacuum insulated container provided with a radiation-heat-blocking film can highly efficiently suppress heat penetration from outside. As the liquid nitrogen bath (the vacuum insulated container) for housing the superconducting coil, a housing container made of FRP (fiber-reinforced plastic) has been widely used. Because FRP has sufficient strength and is low in cost, it has been widely used as the material of a housing container. The providing of a radiation-heat-blocking film at the inside of the vacuum insulated container (the housing container) made of FRP can secure the thermal insulation, against the outside, of the liquid nitrogen bath housing the superconducting coil.

The above-described housing container made of FRP is provided with an opening through the FRP plate forming the wall of the container, and metal members such as the lead electrode and metal pipe are placed such that they pass though the opening. In order to firmly fix the wall of the housing container made of FRP and the metal member penetrating the wall of the housing container to each other, conventionally, the wall of the opening provided through the wall of the housing container made of FRP is provided with an internal thread, and the periphery of the metal member placed such that it passes through the opening is provided with an external thread, and then both are fixed to each other by screwing the external thread into the internal thread. To further increase the bonding strength between the two members, an adhesive is sometimes placed between the external thread and the internal thread.

In the above-described method of fixing the metal member to the housing container made of FRP, the adhesive is applied from the outside of the opening of the FRP plate before the screwing-in of the external-thread portion of the metal member. As a result, when mechanical or thermal stress is applied to the adhesive-bonded portion between the internal and external threads, the bonded portion is sometimes separated or cracks sometimes develop at the bonded portion. When the foregoing separation or cracks develop, the air may leak into the vacuum insulated container from outside. When such a leak occurs, the function of the superconducting coil may be impaired.

To solve the above-described problem, for example, the published Japanese patent application Tokukai 2008-218861 (Patent literature 1) has disclosed a method of producing an FRP cryostat having a structure in which a flange portion is provided both at a member provided with an internal thread (an internal-thread member) and at a member provided with an external thread (an external-thread member) and the flange portion is placed such that its surface is flush with the surface of the plate member (the wall) of the housing container made of FRP. The FRP cryostat stated in Patent literature 1 has a structure in which the plate member (the wall) of the housing container made of FRP is provided with a recessed portion into which the flange portion is fitted. This structure allows uniform application of the adhesive throughout the bonding surfaces of both the bottom surface of the recessed portion and the inner surface of the fitted flange portion. Consequently, this structure further increases the bonding strength between the external-thread member and internal-thread member. In other words, even when mechanical or thermal stress is applied to the bonded portion between the external- and internal-thread members, the development of separation and cracks at the bonded portion can be suppressed. As a result, the function of the superconducting coil can be secured.

In the FRP cryostat disclosed in Patent literature 1, even when different materials are used for forming the external-thread member provided with the flange portion and for forming the metal member, such as a lead electrode, bonded with the external-thread member, because the two members are fixed to each other only at one place of the joint insertion hole formed in the external-thread member, this structure can mitigate the concentration of the thermal stress at the fixed portion, the thermal stress being produced by the difference in thermal expansion (the difference in low-temperature shrinkage ratio) between the external-thread member and the metal member.

SUMMARY OF INVENTION

Technical Problem

Despite the above description, the FRP cryostat disclosed in Patent literature 1 has a problem described below. In this cryostat, the thermal stress caused by the difference in thermal expansion between the housing container made of FRP and the component, such as the external-thread member and the metal member, directly acts upon the bonded portion between the housing container made of FRP and the external-thread member to which the metal member is bonded. As a result, the cryostat cannot completely eliminate the possibility of the development of the separation and cracks at the bonded portion. Furthermore, because the difference is great in thermal expansion coefficient between the FRP and the material forming the metal member and the external-thread member, the possibility of the above-described development of the separation and cracks at the bonded portion becomes high.

In view of the above-described problem, the present invention is made. An object of the present invention is to offer a container for a superconducting apparatus and a superconducting apparatus incorporating the container for a superconducting apparatus, the container being capable of suppressing the development of the separation and cracks at the fixing portion between the wall of the container for a superconducting apparatus and the metal member fixed such that it penetrates the wall of the container for a superconducting apparatus (the container houses a superconductor such as a superconducting coil).

Solution to Problem

A container of the present invention for a superconducting apparatus mounts in it a member including a superconductor. The container for a superconducting apparatus has:
  (a) a housing case made of resin and provided with an opening,
  (b) a metal member positioned such that it passes through the opening, and
  (c) a connecting member that covers the opening, that connects the metal member to the housing case, and that is provided with a curved portion.

The foregoing housing case made of resin may be formed of FRP, for example.

The following case is taken as an example. In the container for a superconducting apparatus, the above-described metal member is fixed to the housing case made of resin through the connecting member. In this container, the temperature at the inside of the housing case is reduced to the liquid nitrogen temperature, for example, in order to cool the superconductor. At this moment, because of the difference in thermal expansion coefficient between the material forming the housing case and the material forming the metal member, the amount of deformation caused by the temperature variation (the amount of thermal contraction) of the housing case differs from that of the metal member. In this case, when the metal member is simply connected and fixed to the housing case through an adhesive or the like, separation or cracks may develop at the connecting portion between the housing case and the adhesive and between the adhesive and the metal member. On the other hand, in the case where the connecting member for connecting the metal member to the housing case has a curved portion, which is a structure that absorbs the difference in the amount of thermal contraction between the metal member and the housing case, even when expansion (or contraction) occurs resulting from the temperature rise (or reduction) of the container for a superconducting apparatus, the difference in the amount of thermal expansion (or contraction) between the metal member and the housing case is absorbed by the deformation of the curved portion. The above-described configuration can suppress the creation of troubles such as separation and cracks caused by the thermal stress at the portion where the metal member is connected to the housing case and thereby enables the reliable connection of the metal member to the housing case.

A container of the present invention for a superconducting apparatus mounts in it a member including a superconductor. The container for a superconducting apparatus has:
  (a) a housing case made of resin and provided with an opening,
  (b) a metal member positioned such that it passes through the opening, and
  (c) a connecting member that covers the opening, that connects the metal member to the housing case, and that includes an elastically deformable portion made of metal.

The following case is taken as an example. In the foregoing container for a superconducting apparatus, the temperature at the inside of the housing case is reduced to the liquid nitrogen temperature, for example, in order to cool the superconductor. At this moment, because of the difference in thermal expansion coefficient between the material forming the housing case and the material forming the metal member, the amount of deformation caused by the temperature variation (the amount of thermal contraction) of the housing case differs from that of the metal member. In this case, when the metal member is simply connected and fixed to the housing case through an adhesive or the like, separation or cracks may develop at the connecting portion between the housing case and the adhesive and between the adhesive and the metal member. On the other hand, in the container of the present invention for a superconducting apparatus, the connecting member for connecting the metal member to the housing case has an elastically deformable portion made of metal, which is a structure that absorbs the difference in the amount of thermal contraction between the metal member and the housing case. Consequently, even when expansion (or contraction) occurs resulting from the temperature rise (or reduction) of the container for a superconducting apparatus, the difference in the amount of thermal expansion (or contraction) between the metal member and the housing case is absorbed by the elastic deformation of the elastically deformable portion. The above-described configuration can suppress the creation of troubles such as separation and cracks caused by the thermal stress at the portion where the metal member is connected to the housing case and thereby enables the reliable connection of the metal member to the housing case.

A superconducting apparatus of the present invention has:
  (a) the above-described container for a superconducting apparatus, and
  (b) a member that includes a superconductor and that is mounted in the container for a superconducting apparatus.

The above structure can suppress the development of cracks or the like at the portion of the housing case (the opening) through which the metal member passes and thereby enables the realization of a superconducting apparatus having high reliability.

As an example of the above-described container of the present invention for a superconducting apparatus, the following container can be shown: that is, the container for a superconducting apparatus has:
  (a) a housing case that is made of FRP as an example of resin and that mounts in it a superconducting coil,
  (b) a lead electrode, which is a metal member for electrically connecting the superconducting coil with the outside load, and
  (c) a connecting member that connects the lead electrode to the housing case.

The lead electrode is placed such that it passes through an opening provided through a plate member that is made of FRP and that constitutes the wall of the housing case. The lead electrode is connected to the housing case through a connecting member having a curved portion. The configuration suppresses the development of separation and cracks at the portion where the lead electrode is connected to the housing case that mounts in it a superconducting coil. The above-described configuration, which securely connects the lead electrode to the housing case, can suppress the generation of a phenomenon in which the electrical property of the superconducting coil is affected by the flowing of the outside air into the housing case, for example.

Advantageous Effects of Invention

According to the present invention, the connecting member for connecting the metal member to the housing case made of resin can absorb the difference in thermal expansion between the metal member and the housing case. Consequently, the connecting member can connect the metal member to the housing case securely with high reliability. Because the metal member such as a lead electrode for electrically connecting the member including a superconductor to the outside load is securely connected to the above-described housing case that is made of resin and that mounts in it the member including the superconductor, the electrical property of the member including the superconductor (for example, a superconducting coil) mounted in the housing case can be suppressed from deteriorating.

DESCRIPTION OF EMBODIMENTS

Figure 1:
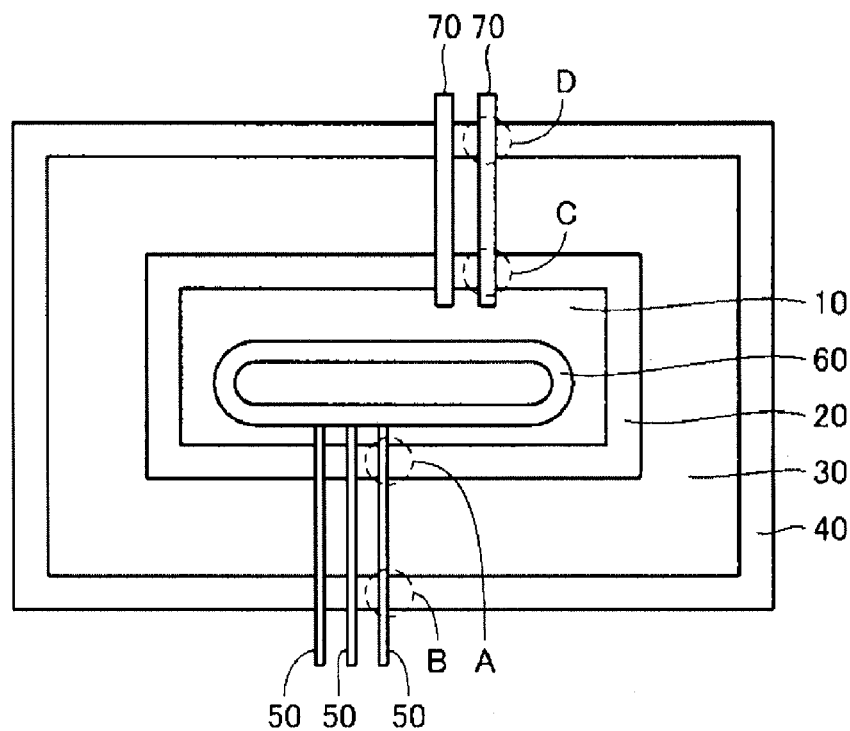
FIG. 1 is a schematic diagram showing the superconducting apparatus in Embodiments of the present invention.

Embodiments of the present invention are explained below by referring to the drawing. In Embodiments, even in the case where different reference signs are given to components performing the same function, the explanation is not repeated unless it is necessary. In the drawing, the ratios of the dimensions are not necessarily coincident with those of the explanation.

Embodiment 1

The superconducting apparatus in Embodiment 1 of the present invention is provided with a container for a superconducting apparatus, the container being according to the present invention, and a superconducting coil 60 mounted in the container for a superconducting apparatus. The container for a superconducting apparatus is provided with a housing case made of FRP for housing the superconducting coil 60, lead electrodes 50 that are metal members for electrically connecting the foregoing superconducting coil with the outside load, and metal pipes 70 for supplying liquid nitrogen as the cooling medium into the housing case. More specifically, as shown in FIG. 1, the superconducting coil 60 is placed in a vacuum insulated container 20 as the housing case formed by using FRP plate members, that is, in the container's inside space 10. The container's inside space 10 of the vacuum insulated container 20 is filled with a cooling medium such as liquid nitrogen. This configuration enables the superconducting coil 60 to function as an electromagnet. A plate member forming one of the sides of the vacuum insulated container 20 is provided with openings for enabling the lead electrodes 50, which are metal members, to pass through. In other words, the lead electrodes 50 are placed (connected) such that they pass through the openings provided through the wall (the plate member) shown at the lower side, in FIG. 1, of the vacuum insulated container 20.

Openings are also provided through the wall (the plate member) shown at the upper side, in FIG. 1, of the vacuum insulated container 20. The pipes 70 are placed such that they pass through the openings. The pipes 70 are connected to a cooling medium-supplying portion (not shown). Liquid nitrogen as the cooling medium is supplied to the container's inside space 10 through the pipes 70.

A vacuum insulated container 40 provided in it with a vacuum insulated bath 30 is further placed at the outside of the vacuum insulated container 20. In other words, the superconducting coil 60 is protected against the outside by the dual vacuum insulated containers. For example, a radiation-heat-blocking film is placed in the vacuum insulated bath 30. The film is placed to suppress heat from penetrating into the inside space 10 of the vacuum insulated container 20 so that the container's inside space 10 can be maintained at a cryogenic state.

As shown in FIG. 1, as with the plate member forming the above-described side of the vacuum insulated container 20, a plate member forming one of the sides of the vacuum insulated container 40 (the side faces the above-described side of the vacuum insulated container 20), also, is provided with openings for enabling the lead electrodes 50 to pass through. In other words, each of the lead electrodes 50 is connected at one end to the superconducting coil 60 placed in the container's inside space 10; passes through the vacuum insulated container 20, the vacuum insulated bath 30, and the vacuum insulated container 40; and is connected at the other end, for example, to the outside load (not shown) placed at the outside of the vacuum insulated container 40.

Even when the inside space 10 of the vacuum insulated container 20 is doubly heat-insulated against the outside as shown in FIG. 1, heat sometimes penetrates from the outside into the inside space 10 of the vacuum insulated container 20. The heat penetrating from the outside (heat penetration) is classified into three types: one is the heat $Q_C$ that penetrates into the container's inside space 10 from the surface of the vacuum insulated container 20, another is the heat $Q_L$ that penetrates into the container's inside space 10 from outside through the lead electrodes 50 connected to the superconducting coil 60, and the other is the heat $Q_N$ that penetrates into the container's inside space 10 from outside through the pipes 70.

When the vacuum degree in the vacuum insulated bath 30 is denoted as P, the gap length of the vacuum insulated bath 30 is denoted as h, and the outer surface area of the vacuum insulated container 40 is denoted as S, the heat $Q_C$ is proportional to $P^2 \times S/h$. In the above description, the gap length is equal to the width of the vacuum insulated bath 30 in FIG. 1, that is, the distance between the outer surface of the vacuum insulated container 20 and the inner surface of the vacuum insulated container 40. The heat $Q_L$ is proportional to the magnitude of a current I flowing along the lead electrodes 50 from the outside load connected to the lead electrodes 50 toward the superconducting coil 60.

Because of the above-described heat penetration such as $Q_C$ and $Q_L$, as a result of the entrance and exit of the heat, thermal expansion or contraction is generated at the region, for example, the region A encircled by a broken line in FIG. 1, that is, at one of the plate members forming the vacuum insulated container 20 and at the lead electrode 50. The thermal expansion and contraction causes thermal stress to develop at the member connecting the lead electrode 50 to the vacuum insulated container 20. As a result, separation or cracks may develop at the connecting portion between the connecting member and the vacuum insulated container 20 or the lead electrode 50.

Figure 2:
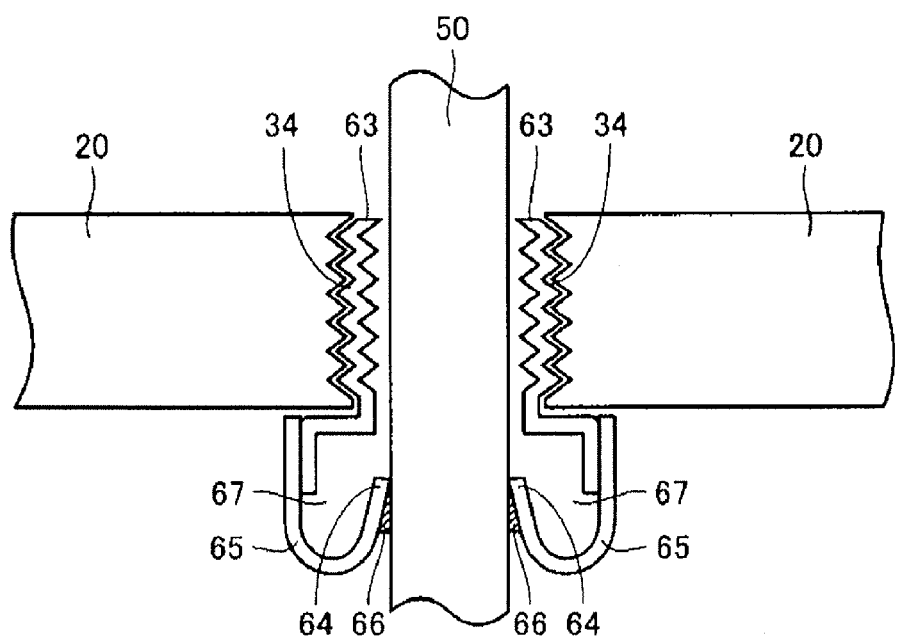
FIG. 2 is an enlarged diagram of the region A encircled by a broken line in FIG. 1.
Figure 3:
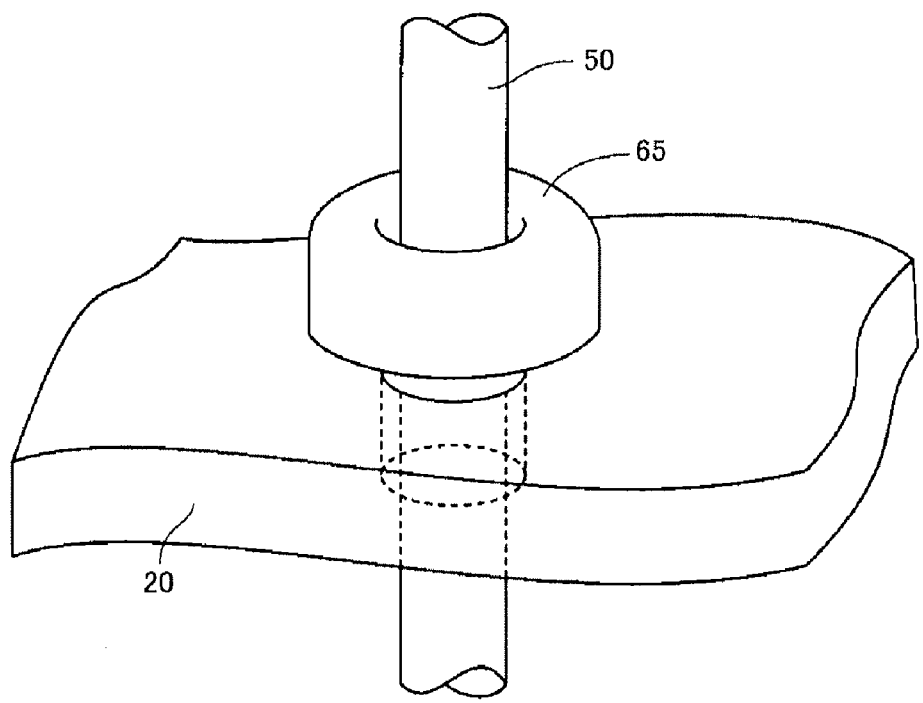
FIG. 3 is a schematic perspective view of the region shown in FIG. 2.

To suppress the foregoing development of separation and cracks, in Embodiment 1, in the portion shown as the region A in FIG. 1 (the portion where the lead electrode 50 is connected to the vacuum insulated container 20), the connection is performed as shown in FIGS. 2 and 3. More specifically, as shown in FIG. 2, the connecting member has a first connecting member 63 and a second connecting member 65, both of which are connected to each other. The first connecting member 63 is connected to the plate member of the vacuum insulated container 20 and extends along the lead electrode 50. The second connecting member 65 has a curved portion and is connected to the lead electrode 50 at the curved portion's end 64 through a bonding material 66.

The first connecting member 63 is provided with a peak-and-trough portion 34, which functions as a screw thread, at a portion to be inserted into the opening of the vacuum insulated container 20. Accordingly, the wall of the opening of the vacuum insulated container 20, also, is provided with a peak-and-trough portion, which functions as a screw thread, to mate with the above-described peak-and-trough portion 34. The first connecting member 63 is composed of a hollow cylindrical portion that is provided with the foregoing peak-and-trough portion 34 and that is to be inserted into the opening and a flange portion formed at the end of the hollow cylindrical portion. The flange portion is formed such that it extends radially toward the outer side, with its center being coincident with the center of the axis of the hollow cylindrical portion. At the periphery of the flange portion, a hollow cylindrical connecting wall portion is formed to be connected with the above-described second connecting member 65.

As shown in FIGS. 2 and 3, the second connecting member 65 has the shape of a ring having a U-shaped cross section formed by the curved portion (the shape of a torus). In other words, the second connecting member 65 has an annular shape whose inner peripheral portion is in contact with the peripheral surface of the lead electrode 50. The outer peripheral portion of the second connecting member 65 is connected to the connecting wall portion, which is positioned at the periphery of the flange portion of the foregoing first connecting member 63. The inner peripheral portion of the second connecting member 65 is connected to the peripheral surface of the lead electrode 50 through the bonding material 66.

The first connecting member 63 is connected and fixed to the vacuum insulated container 20 by screwing the peak-and-trough portion 34 of the first connecting member 63 into the peak-and-trough portion formed on the wall of the opening of the vacuum insulated container 20. The connecting structure in the region B in FIG. 1 and in the portions for connecting another lead electrode 50 to the vacuum insulated containers 20 and 40 is the same as the structure shown in FIGS. 2 and 3.

It is desirable that the first connecting member 63 and the second connecting member 65 be composed of Fe—Ni alloy, for example. In addition, it is desirable that the Fe—Ni alloy forming the first connecting member 63 and the Fe—Ni alloy forming the second connecting member 65 have the same composition. When these conditions are met, the generation of the thermal stress can be suppressed at the connecting portion between the first connecting member 63 and the second connecting member 65. The first connecting member 63 and the second connecting member 65 may be connected to each other through any method using the well-known adhesive, brazing or soldering filler metal, or the like.

In the superconducting apparatus shown in FIGS. 2 and 3, in a gap 67 between the lead electrode 50 and the connecting member, in particular, the gap between the first connecting member 63 and the lead electrode 50 (the distance in the left-to-right direction in FIG. 2) can be considerably narrower than the gap between the inner surface of the outer peripheral portion of the second connecting member 65 and the lead electrode 50. Consequently, the diameter of the first connecting member 63's portion where the peak-and-trough portion 34 is formed can be smaller than the maximum diameter of the second connecting member 65 (that is, the maximum diameter of the curved portion). Accordingly, the diameter of the opening formed in the vacuum insulated container 20 can be smaller than the maximum diameter of the second connecting member 65. The airtightness, therefore, can be further enhanced at the portion where the lead electrode 50 is connected to the vacuum insulated container 20. As a result, they can be connected to each other more reliably.

The difference in thermal expansion, in the left-to-right direction in FIG. 2, between the vacuum insulated container 20 and the lead electrode 50 is absorbed by the second connecting member 65. As described above, the second connecting member 65 has the curved portion, so that there is the gap 67 between the lead electrode 50 and the second connecting member 65. The gap 67 is wider than the gap between the lead electrode 50 and the first connecting member 63. In other words, the diameter of the opening of the vacuum insulated container 20 can be small (the first connecting member 63 is inserted into the opening and fixed to the vacuum insulated container 20), and the curved portion formed in the second connecting member 65 can have a large radius of curvature. Hence, the difference in thermal expansion between the plate member of the vacuum insulated container 20 and the lead electrode 50 can be absorbed sufficiently by the deformation of the curved portion.

When the above-described configuration is employed, the decreasing of the diameter of the opening, into which the first connecting member 63 is inserted, increases the airtightness of the container's inside space 10 against the outside, and the difference in thermal expansion between the plate member of the vacuum insulated container 20 and the lead electrode 50 is absorbed by the curved portion of the second connecting member 65. In consequence, the development of separation and cracks at the connecting portion can be more reliably suppressed. As a result, the function of the superconducting coil 60 can be more reliably secured.

In addition, as with the curved portion, the peak-and-trough portion 34 shown in FIG. 2 can deform itself elastically. More specifically, the peak-and-trough portion 34 can vary its length freely in the top-to-bottom direction in FIG. 2 according to the expansion and contraction. Consequently, the connecting member can not only deform itself freely in the left-to-right direction in FIG. 2 by the action of the curved portion but also deform itself freely to a certain extent in the top-to-bottom direction in FIG. 2 by the action of the peak-and-trough portion 34. The peak-and-trough portion 34, therefore, can more reliably absorb the thermal stress between the lead electrode 50 and the vacuum insulated container 20.

It is desirable that the metal member forming the lead electrode 50 be composed of copper (Cu), for example. Because the lead electrode 50 is a member for transmitting electrical signals, it is desirable to employ copper as a material excellent in electric conductivity and low in cost. Nevertheless, the lead electrode 50 may be formed by using, for example, aluminum or silver in place of copper.

It is desirable that the material forming the first and second connecting members 63 and 65 of the connecting member have a thermal expansion coefficient at most two times that of the FRP forming the vacuum insulated container 20. More specifically, it is desirable that the connecting member be composed of Fe—Ni alloy.

FRP has a thermal expansion coefficient (a coefficient of linear expansion) of $6 \times 10^{-6}$ (/° C.) at 20° C. Consequently, it is desirable that the connecting member have a thermal expansion coefficient of $12 \times 10^{-6}$ (/° C.) or less at 20° C.

The thermal expansion coefficient (the coefficient of linear expansion) of Fe—Ni alloy at 20° C. depends on the ratio of iron and nickel (the percentage contained in the alloy). For example, when the alloy contains about 36 mass % nickel and about 64 mass % iron, the alloy has a thermal expansion coefficient of $1 \times 10^{-6}$ (/° C.) at 20° C., which is its minimum value. When the nickel content is either increased or decreased from the foregoing content, the thermal expansion coefficient increases monotonously. More specifically, when the nickel content in the alloy is about 0 mass %, the alloy has a thermal expansion coefficient of $10 \times 10^{-6}$ (/° C.) at 20° C. When the nickel content in the alloy is about 70 mass %, the alloy has a thermal expansion coefficient of $12 \times 10^{-6}$ (/° C.) at 20° C. In consequence, when Fe—Ni alloy is used for the connecting member as described above, it is desirable that the nickel content in the alloy be 70 mass % or less. When the nickel content in the alloy is about 30 mass % or about 42 mass %, the alloy has a thermal expansion coefficient of $6 \times 10^{-6}$ (/° C.) at 20° C., which is the same as that of FRP at 20° C. Consequently, when Fe—Ni alloy is used as the material of the connecting member, it is particularly desirable that the nickel content in the alloy be about 30 mass % or about 42 mass %. In other words, the smaller the difference in thermal expansion coefficient at 20° C. between the vacuum insulated container 20 and the connecting member, the smaller the difference in thermal expansion (or contraction) between the vacuum insulated container 20 and the connecting member. As a result, the lead electrode 50 can be connected to the vacuum insulated container 20 with higher quality.

The vacuum insulated bath 30 at the inside of the vacuum insulated container 40 is a thermally insulated bath in a vacuum state in order to suppress the earlier described heat $Q_C$ from penetrating into the vacuum insulated container 20 (the container's inside space 10). Consequently, as with the container's inside space 10, the vacuum insulated bath 30 is required to block the flowing-in of the air or the like from outside. For that reason, it is desirable that the lead electrode 50 be connected to the vacuum insulated container 40 highly reliably by using the connecting member shown in FIGS. 2 and 3. It is desirable that in the region B encircled by a broken line in FIG. 1, the lead electrode 50 be connected to the vacuum insulated container 40 by using the same method as used in the region A encircled by a broken line in FIG. 1. In other words, it is desirable that the foregoing connection be performed by the method in which the vacuum insulated container 20 shown in FIG. 2 is replaced with the vacuum insulated container 40.

Figure 4:
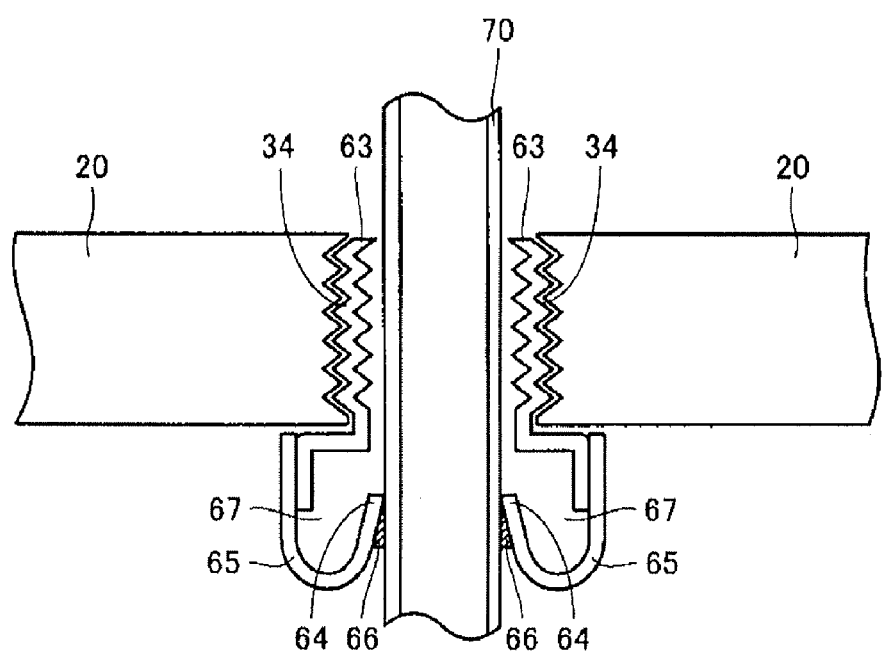
FIG. 4 is an enlarged diagram of the region C encircled by a broken line in FIG. 1.

Next, by referring to FIG. 4, an explanation is given to the structure of the connecting portion between the pipe 70 and the vacuum insulated container 20 in the region C in FIG. 1. As shown in FIG. 4, the structure of the connecting portion between the pipe 70 and the vacuum insulated container 20 is basically the same as the structure of the connecting portion between the lead electrode 50 and the vacuum insulated container 20 shown in FIGS. 2 and 3. More specifically, in the connecting portion shown in FIG. 4, the pipe 70 for circulating the cooling medium passes through the opening in place of the lead electrode 50 in FIG. 2 and is connected with the second connecting member 65. As with the connecting portion shown in FIGS. 2 and 3, the above-described configuration can suppress the development of separation and cracks at the connecting portion between the pipe 70 and vacuum insulated container 20. The structure in the region D in FIG. 1 and in the portions for connecting the other pipe 70 to the vacuum insulated containers 20 and 40 is basically the same as the structure of the connecting portion shown in FIG. 4.

Embodiment 2

Figure 5:
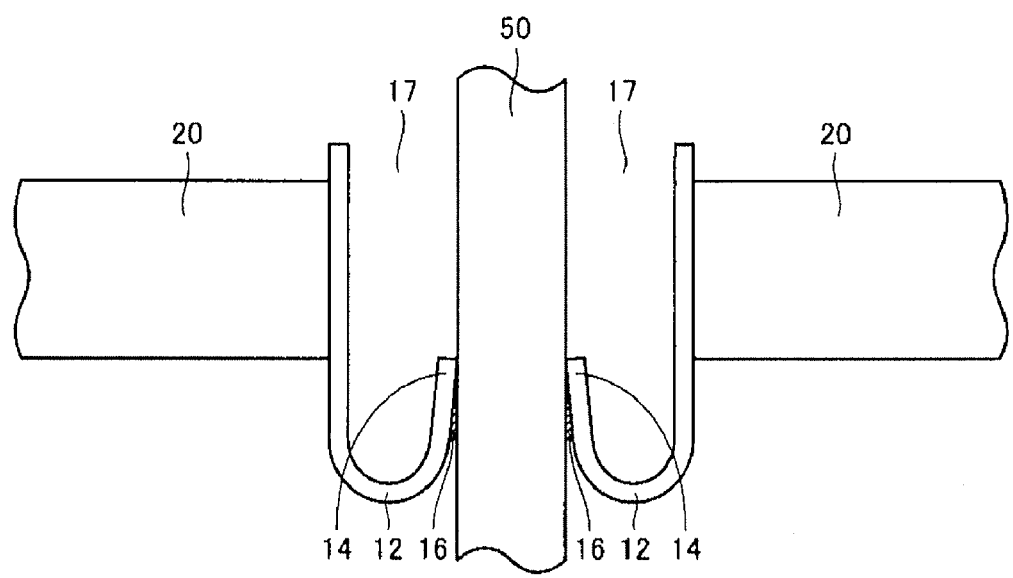
FIG. 5 is an enlarged diagram of the region A encircled by a broken line in FIG. 1 in Embodiment 2 of the present invention.

The superconducting apparatus in Embodiment 2 of the present invention is explained below. The apparatus includes a container for a superconducting apparatus. By referring to FIG. 5, an explanation is given to the structure of the connecting portion in the container for a superconducting apparatus, the connecting portion being formed between the lead electrode and the vacuum insulated container. FIG. 5 corresponds to FIG. 2.

The superconducting apparatus in Embodiment 2 of the present invention has basically the same structure as that of the superconducting apparatus shown in FIGS. 1 to 4. However, the structure of the connecting portion between the lead electrode 50 and the vacuum insulated containers 20 and 40 is different from the structure shown in FIGS. 2 and 3. In other words, as shown in FIG. 5, a connecting member 12 for connecting the lead electrode 50 to the plate member of the vacuum insulated container 20 has an elastically deformable structure (the shape of a spring) that can absorb the difference in thermal expansion between the vacuum insulated container 20 made of FRP and the lead electrode 50. More specifically, as shown in FIG. 5, the connecting member 12 has the shape of a ring having a J-shaped cross section formed by a curved portion (the ring surrounds the peripheral surface of the lead electrode 50). The end of the curved portion, which is the curved portion's end 14, is connected to the lead electrode 50 through a bonding material 16. When viewed from below, the connecting member 12 has an annular shape along the peripheral surface of the lead electrode 50.

When the above-described configuration is employed, as with the second connecting member 65 in the superconducting apparatus shown in FIGS. 1 to 4 (see FIG. 2), the curved portion of the connecting member 12 absorbs the difference in thermal expansion between the vacuum insulated container 20 (FRP) and the lead electrode 50. More specifically, in the bonding material 16 at the curved portion's end 14, thermal stress is produced by the difference in the thermal expansion owing to the difference in material between the lead electrode 50 and the connecting member 12. The thermal stress tends to propagate toward the vacuum insulated container 20 along the connecting member 12. The curved portion of the connecting member 12, however, blocks the propagation of the thermal stress (in other words, the deformation of the curved portion absorbs the thermal stress). For that reason, the percentage of the thermal stress arriving at the vacuum insulated container 20 is decreased. That is, because the connecting member 12 has the curved portion, the difference in thermal expansion between the vacuum insulated container 20 and the connecting member 12 or the lead electrode 50 or both is absorbed. Consequently, the possibility of the development of separation and cracks can be decreased at the connecting portion between the lead electrode 50 and the connecting member and between the vacuum insulated container 20 and the connecting member. As a result, this structure can decrease the possibility of the deterioration of the electrical property of the superconducting coil 60 resulting from, for example, the flowing of the air into the container's inside space 10 through the cracks or the like.

In addition, as shown in FIG. 5, there is a gap 17 between the lead electrode 50 and the vacuum insulated container 20 because the width (diameter) of the opening of the vacuum insulated container 20 is designed to be larger than the width (diameter) of the lead electrode 50. The gap 17 is used as the region in which the curved portion of the connecting member 12 extends. In consequence, the curved portion of the connecting member 12 has a sufficient radius of curvature, so that the elastic deformation of the curved portion can easily absorb the difference in thermal expansion between the vacuum insulated container 20 and the lead electrode 50.

It is desirable to employ the well-known welding method or a method using brazing or soldering (performed by using brazing or soldering filler metal) as the method of connecting the connecting member 12 to the lead electrode 50 through the bonding material 16. In FIG. 5, the connecting member 12 may be connected to the vacuum insulated container 20 through any method using the well-known adhesive, brazing or soldering filler metal, or the like.

As described above, the connecting member 12, which has the curved portion and which is made of a material having a thermal expansion coefficient only slightly different from that of FRP, absorbs the difference in thermal expansion between the lead electrode 50 and the vacuum insulated container 20. For that reason, as with the first and second connecting members 63 and 65 shown in FIGS. 1 to 3, the connecting member 12 can securely and highly reliably connect the lead electrode 50 to the vacuum insulated container 20. In other words, the connecting member 12 can suppress the leakage from outside to the container's inside space 10 and thereby enhance the function of the superconducting coil 60 in the container's inside space 10.

In order to cause the superconducting coil 60 in the container's inside space 10 to function with high performance, it is desirable that the connecting member 12 be used in the region A in FIG. 1, the region A being the connecting portion between the vacuum insulated container 20 and the lead electrode 50. In addition, as with in the region A encircled by a broken line in FIG. 1, in the region B encircled by a broken line, the connection may be performed by using the connecting member 12. Furthermore, as with the superconducting apparatus shown in FIGS. 1 to 4, the connecting member 12 shown in FIG. 5 may be applied to the region C and the like in FIG. 1 (that is, the portion where the pipe 70 is connected to the vacuum insulated containers 20 and 40).

Embodiment 2 of the present invention differs from Embodiment 1 of the present invention only in the above-described respects. In other words, the structure, condition, procedure, effect, and so on omitted in the description on Embodiment 2 of the present invention are all in accordance with those of Embodiment 1 of the present invention.

Embodiment 3

Figure 6:
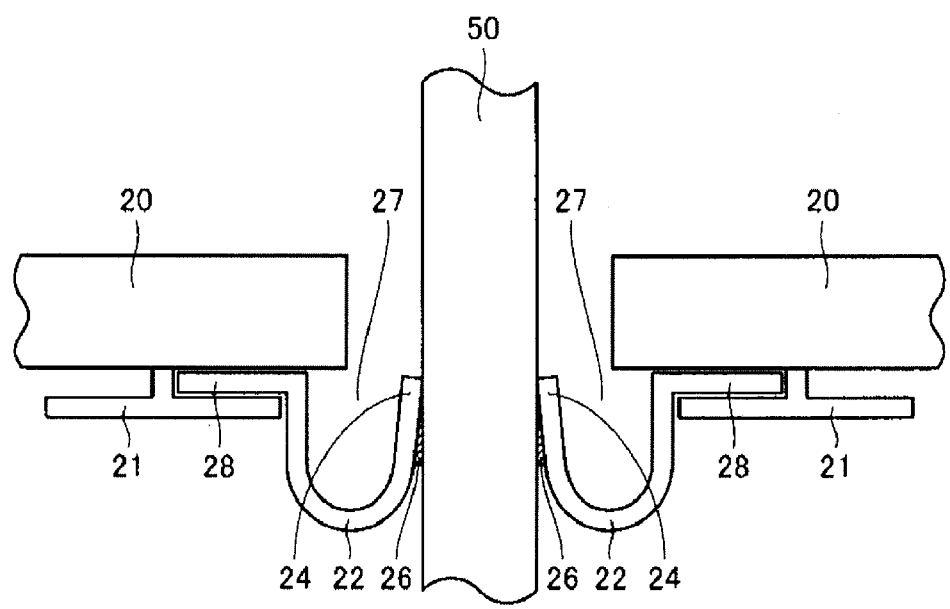
FIG. 6 is an enlarged diagram of the region A encircled by a broken line in FIG. 1 in Embodiment 3 of the present invention.

The superconducting apparatus in Embodiment 3 of the present invention is explained below. The apparatus includes a container for a superconducting apparatus. By referring to FIG. 6, an explanation is given to the structure of the connecting portion in the container for a superconducting apparatus, the connecting portion being formed between the lead electrode and the vacuum insulated container. FIG. 6 corresponds to FIG. 2.

The superconducting apparatus in Embodiment 3 of the present invention has basically the same structure as that of the superconducting apparatus shown in FIGS. 1 to 4. However, the structure of the portion where the lead electrode 50 is connected to the vacuum insulated containers 20 and 40 is different from the structure shown in FIGS. 2 and 3. In other words, as shown in FIG. 6, although a connecting member 22 for connecting the lead electrode 50 to the vacuum insulated container 20 has, as with the connecting member 12 shown in FIG. 5, an annular shape when viewed from below and a curved portion having a U-shaped cross section, the connecting member 22 further has a flange portion 28 extending to the outer side from the peripheral end portion of the curved portion. The connecting member 22 is fixed to the plate member of the vacuum insulated container 20 by a fixing member 21 at a region in which the plate member extends (the region in the left-to-right direction in FIG. 6). By pressing the flange portion 28 formed at the peripheral portion of the connecting member 22 to the plate member of the vacuum insulated container 20 from below upward in FIG. 6 by using the fixing member 21, the flange portion 28 of the connecting member 22 is fixed to the vacuum insulated container 20. The fixing member 21 may have, for example, an annular shape when viewed from below. The fixing member 21 can be fixed to the vacuum insulated container 20 by using the well-known method. For example, the fixing member 21 may be fixed to the vacuum insulated container 20 by using a securing member such as a bolt or an adhesive. On the other hand, the connecting member 22 is connected to the lead electrode 50 by using a bonding material 26 at the curved portion's end 24 as with Embodiment 1 (see FIG. 2).

In the region where the connecting member 22 is positioned, an opening is formed through the plate member of the vacuum insulated container 20 to allow the lead electrode 50 to pass through. The opening has a width (diameter) larger than that of the lead electrode 50. Consequently, there is a gap 27 between the lead electrode 50 and the vacuum insulated container 20. As shown in FIG. 6, however, in the gap 27, the region between the lead electrode 50 and the vacuum insulated container 20 has a width (the distance between the wall of the opening formed in the vacuum insulated container 20 and the surface of the lead electrode 50) narrower than the width (in the left-to-right direction in FIG. 6) of the curved portion of the connecting member 22. More specifically, the gap 27 between the lead electrode 50 and the vacuum insulated container 20 has a width about half the width of the curved portion of the connecting member 22.

As described above, the configuration shown in FIG. 6 enables the diameter of the opening formed at the vacuum insulated container 20 to become smaller than the diameter of the corresponding opening shown in FIG. 5. In other words, about half the width (in the left-to-right direction in FIG. 6) of the curved portion of the connecting member 22 (the half positioned at the periphery side in FIG. 6) overlaps the region around the opening when viewed from below. By employing the above-described connecting method, in the structure shown in FIG. 6, the width (diameter) of the opening formed in the vacuum insulated container 20 (the opening through which the lead electrode 50 passes) can be determined to be small without regard to the size of the connecting member 22. The above-described decreasing of the width of the opening can further increase the airtightness of the connecting portion between the lead electrode 50 and the vacuum insulated container 20. The connecting member 22 shown in FIG. 6 may be applied to the regions C and D in FIG. 1, which are the connecting portions between the pipe 70 and the vacuum insulated container 20 and between the pipe 70 and the vacuum insulated container 40, respectively.

Embodiment 3 of the present invention differs from Embodiment 2 of the present invention only in the above-described respects. In other words, the structure, condition, procedure, effect, and so on omitted in the description on Embodiment 3 of the present invention are all in accordance with those of Embodiment 2 of the present invention.

Embodiment 4

Figure 7:
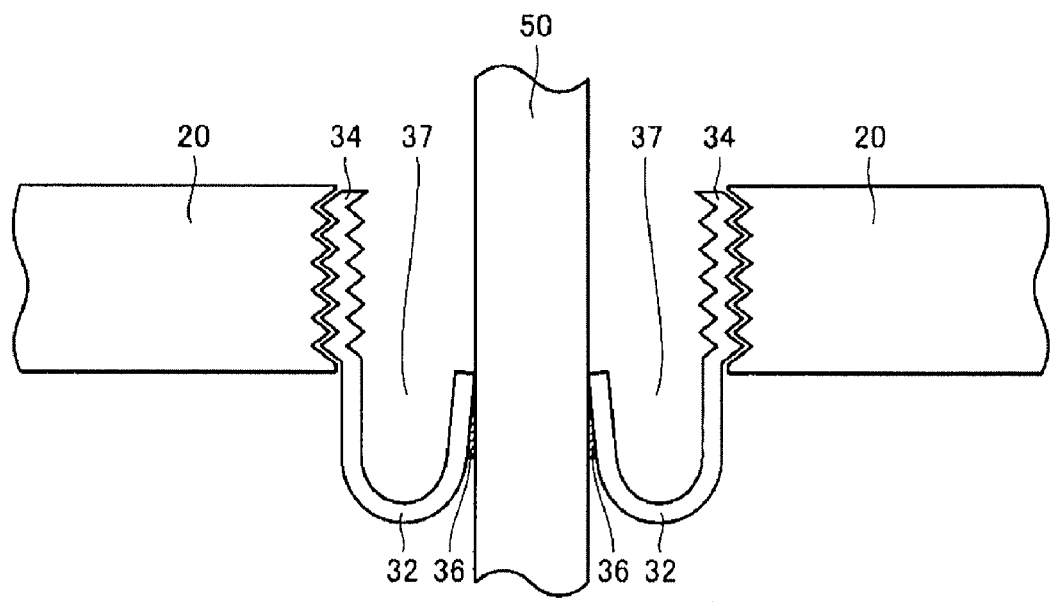
FIG. 7 is an enlarged diagram of the region A encircled by a broken line in FIG. 1 in Embodiment 4 of the present invention.

The superconducting apparatus in Embodiment 4 of the present invention is explained below. The apparatus includes a container for a superconducting apparatus. By referring to FIG. 7, an explanation is given to the structure of the connecting portion in the container for a superconducting apparatus, the connecting portion being formed between the lead electrode and the vacuum insulated container. FIG. 7 corresponds to FIG. 2.

The superconducting apparatus in Embodiment 4 of the present invention has basically the same structure as that of the superconducting apparatus including the connecting member shown in FIG. 5. However, the structure of the portion where the lead electrode 50 is connected to the vacuum insulated containers 20 and 40 is different from the structure shown in FIG. 5. In other words, as shown in FIG. 7, at the portion where the connecting member 32 is connected to the vacuum insulated container 20, the connecting member 32 and the plate member of the vacuum insulated container 20 are each provided with a peak-and-trough portion 34.

For example, in FIG. 5, the portion where the connecting member 12 is connected to the vacuum insulated container 20 has a linear cross section. On the other hand, the connecting member shown in FIG. 7 is different from Embodiment 2 shown in FIG. 5 only in the point that the portion where the connecting member is connected has a cross section formed of the peak-and-trough portion 34, rather than a linear cross section. More specifically, by screwing the peak-and-trough portion 34, which is the screw thread of the connecting member 32, into the corresponding peak-and-trough portion formed on the wall of the opening of the vacuum insulated container 20, the connecting member 32 is connected to the vacuum insulated container 20. The structure of the connecting portion shown in FIG. 7 is the same as that of Embodiment 2 of the present invention described above with regard to the other feature at the opening. That is, the curved portion of the connecting member 32 is connected to the lead electrode 50 through the bonding material 36. The connecting member 32 is placed such that it bridges the gap 37 between the plate member of the vacuum insulated container 20 and the lead electrode 50.

As described above, the peak-and-trough portion 34 acts as a thread portion for connecting and fixing the connecting member 32 to the vacuum insulated container 20. As with the curved portion of the connecting member 32, the peak-and-trough portion 34 acts as a spring structure capable of elastically deforming itself for absorbing the difference in thermal expansion between the plate material and lead electrode 50. More specifically, for example, the thermal stress produced in the bonding material 36 between the lead electrode 50 and the connecting member 32 can be suppressed from propagating toward the vacuum insulated container 20 not only by the curved portion of the connecting member 32 but also by the peak-and-trough portion 34. Because the connecting member 32 has the peak-and-trough portion 34 in addition to the curved portion, it can further absorb the difference in thermal expansion between the vacuum insulated container 20 and the connecting member 32 or the lead electrode 50 or both. Consequently, the possibility of the development of separation, cracks, and the like can be further decreased at the connecting portion between the lead electrode 50 and the vacuum insulated container 20. As a result, this structure can further decrease the possibility of the deterioration of the electrical property of the superconducting coil 60 resulting from, for example, the flowing of the air into the container's inside space 10.

As with the peak-and-trough portion 34 shown in FIG. 2, the peak-and-trough portion 34 shown in FIG. 7 can elastically deform itself as with the curved portion. More specifically, the peak-and-trough portion 34 shown in FIG. 7 can vary its length freely in the top-to-bottom direction in FIG. 7 according to the expansion and contraction. Consequently, the connecting member 32 can not only deform itself freely in the left-to-right direction in FIG. 7 by the action of the curved portion but also deform itself freely to a certain extent in the top-to-bottom direction in FIG. 7 by the action of the peak-and-trough portion 34. The peak-and-trough portion 34, therefore, can more reliably absorb the thermal stress between the lead electrode 50 and the vacuum insulated container 20.

As with the connection between the lead electrode 50 and the vacuum insulated container 20 in FIG. 2 for Embodiment 1, the connection between the lead electrode 50 and the vacuum insulated container 20 at the peak-and-trough portion 34 may be performed through any method using the well-known adhesive, brazing or soldering filler metal, or the like. As with the superconducting apparatus shown in FIGS. 1 to 4, the connecting member 32 shown in FIG. 7 may be applied to the region C and the like in FIG. 1 (that is, the connecting portion between the pipe 70 and the vacuum insulated containers 20 and 40).

Embodiment 4 of the present invention differs from Embodiment 2 of the present invention only in the above-described respects. In other words, the structure, condition, procedure, effect, and so on omitted in the description on Embodiment 4 of the present invention are all in accordance with those of Embodiment 2 of the present invention.

Embodiment 5

Figure 8:
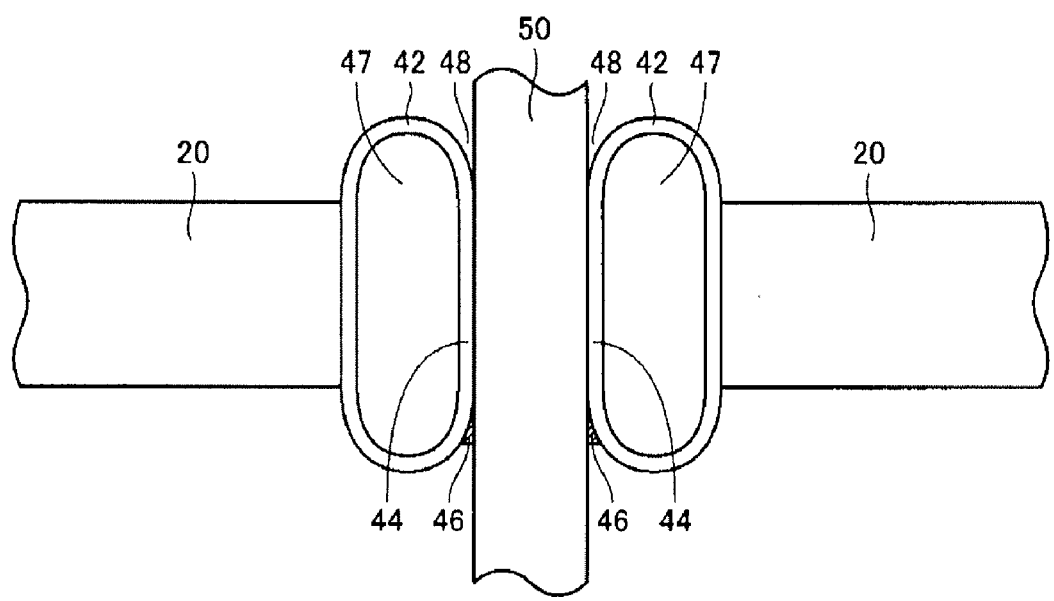
FIG. 8 is an enlarged diagram of the region A encircled by a broken line in FIG. 1 in Embodiment 5 of the present invention.

The superconducting apparatus in Embodiment 5 of the present invention is explained below. The apparatus includes a container for a superconducting apparatus. By referring to FIG. 8, an explanation is given to the structure of the connecting portion in the container for a superconducting apparatus, the connecting portion being formed between the lead electrode 50 and the vacuum insulated container. FIG. 8 corresponds to FIG. 2.

The superconducting apparatus in Embodiment 5 of the present invention has basically the same structure as that of the superconducting apparatus shown in FIGS. 1 to 4. However, the structure of the connecting portion between the lead electrode 50 and the vacuum insulated containers 20 and 40 is different from the structure shown in FIGS. 2 and 3. More specifically, as shown in FIG. 8, a connecting member 42 has two curved portions: one at the upper side in FIG. 8 and the other at the lower side. That is, the connecting member 42 has a cross section formed by a ring surrounding a gap 47. When viewed from below in FIG. 8, the connecting member 42 has an annular shape along the peripheral surface of the lead electrode 50.

For example, as shown in FIG. 5, the connecting member 12 in Embodiment 2 has only one curved portion at the lower side. The connecting member 12 is connected to the lead electrode 50 at the curved portion's end 14, which is the end portion of the curved portion, through the bonding material 16. As with this connecting method, the connecting member 42 in FIG. 8 is connected to the lead electrode 50 at a connecting region 44, which corresponds to the curved portion's end 14 in FIG. 5, through the bonding material 46. Alternatively, the connecting member 42 may be connected to the lead electrode 50 at an upper curved portion's connecting region 48, which is located at the end of the upper curved portion, through the bonding material 46. Yet alternatively, the connecting member 42 may be connected to the lead electrode 50 at both the upper and lower sides through the bonding material 46.

Because the connecting member 42 has two curved portions, one at the upper side and the other at the lower side, as shown in FIG. 8, it can more reliably absorb the thermal stress caused by the difference in thermal expansion coefficient between the lead electrode 50 and the vacuum insulated container 20.

In FIG. 8, also, the connecting member 42 may be connected to the vacuum insulated container 20 through any method using the well-known adhesive, brazing or soldering filler metal, or the like. In addition, as with Embodiment 4 shown in FIG. 7, in FIG. 8, also, a peak-and-trough portion may be formed at the portion in which the connecting member 42 is connected to the vacuum insulated container 20. When this design is employed, as described earlier, the peak-and-trough portion can more reliably absorb the difference in thermal expansion between the lead electrode 50 and the vacuum insulated container 20. Furthermore, as with the superconducting apparatus shown in FIGS. 1 to 4, the connecting member 42 shown in FIG. 8 may be applied to the region C and the like in FIG. 1 (that is, the connecting portion between the pipe 70 and the vacuum insulated containers 20 and 40).

Embodiment 5 of the present invention differs from Embodiment 1 of the present invention only in the above-described respects. In other words, the structure, condition, procedure, effect, and so on omitted in the description on Embodiment 5 of the present invention are all in accordance with those of Embodiment 1 of the present invention.

Embodiment 6

Figure 9:
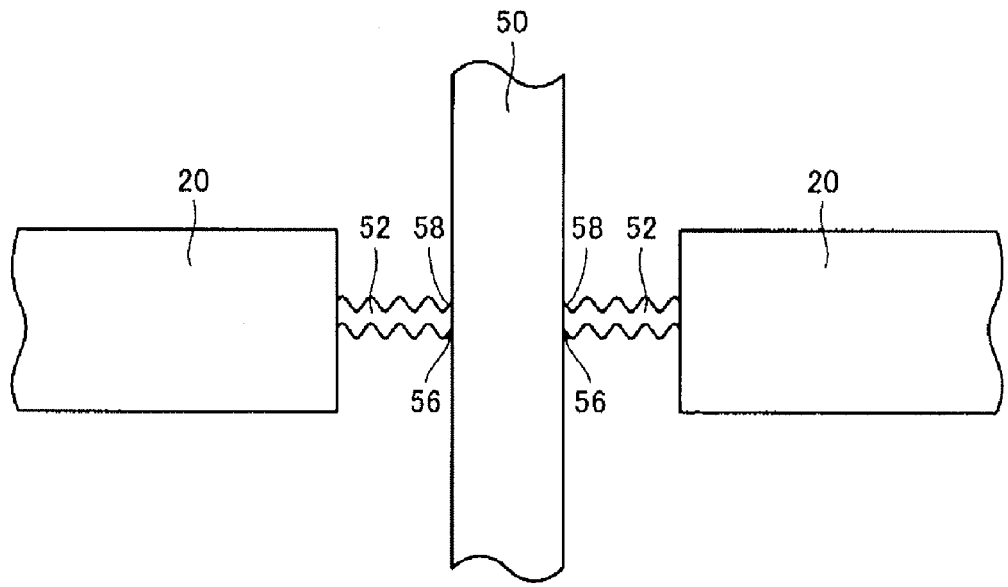
FIG. 9 is an enlarged diagram of the region A encircled by a broken line in FIG. 1 in Embodiment 6 of the present invention.

The superconducting apparatus in Embodiment 6 of the present invention is explained below. The apparatus includes a container for a superconducting apparatus. By referring to FIG. 9, an explanation is given to the structure of the connecting portion in the container for a superconducting apparatus, the connecting portion being formed between the lead electrode 50 and the vacuum insulated container. FIG. 9 corresponds to FIG. 2.

The superconducting apparatus in Embodiment 6 of the present invention has basically the same structure as that of the superconducting apparatus shown in FIGS. 1 to 4. However, the structure of the connecting portion between the lead electrode 50 and the vacuum insulated containers 20 and 40 is different from the structure shown in FIGS. 2 and 3. In other words, as shown in FIG. 9, a connecting member 52 for connecting the lead electrode 50 to the plate member of the vacuum insulated container 20 extends in the left-to-right direction in FIG. 9 and has a peak-and-trough-formed portion that includes portions forming peaks and troughs in the upward-and-downward direction in FIG. 9. When viewed from below in FIG. 9, the connecting member 52 has an annular shape along the peripheral surface of the lead electrode 50. As shown in FIG. 9, because the connecting member 52 includes a peak-and-trough-formed portion, which forms the shape of a spring, the connecting member 52 can freely vary its width in the left-to-right direction in FIG. 9 (it can expand and contract). As described above, because the connecting member 52 has the shape of a spring, as with the above-described connecting members of Embodiments, it can absorb the difference in thermal expansion between the plate member of the vacuum insulated container 20 and the lead electrode 50.

The connecting member 52 is connected to the lead electrode 50 at the lower side shown in FIG. 9 through a bonding material 56. Alternatively, the connecting member 52 may be connected to the lead electrode 50 at an upper connecting region 58 at the upper side in FIG. 9. It is more desirable that the gap between the lead electrode 50 and the plate member of the vacuum insulated container 20 (the width of the opening in which the connecting member 52 is placed) be decreased to a minimum possible value in terms of suppressing the development of leakage at the portion between the lead electrode 50 and the vacuum insulated container 20.

In FIG. 9, also, the connecting member 52 may be connected to the vacuum insulated container 20 through any method using the well-known adhesive, brazing or soldering filler metal, or the like. In addition, as with the superconducting apparatus shown in FIGS. 1 to 4, the connecting member 52 shown in FIG. 9 may be applied to the region C and the like in FIG. 1 (that is, the connecting portion between the pipe 70 and the vacuum insulated containers 20 and 40).

Embodiment 6 of the present invention differs from Embodiment 1 of the present invention only in the above-described respects. In other words, the structure, condition, procedure, effect, and so on omitted in the description on Embodiment 6 of the present invention are all in accordance with those of Embodiment 1 of the present invention.

Embodiment 7

Figure 10:
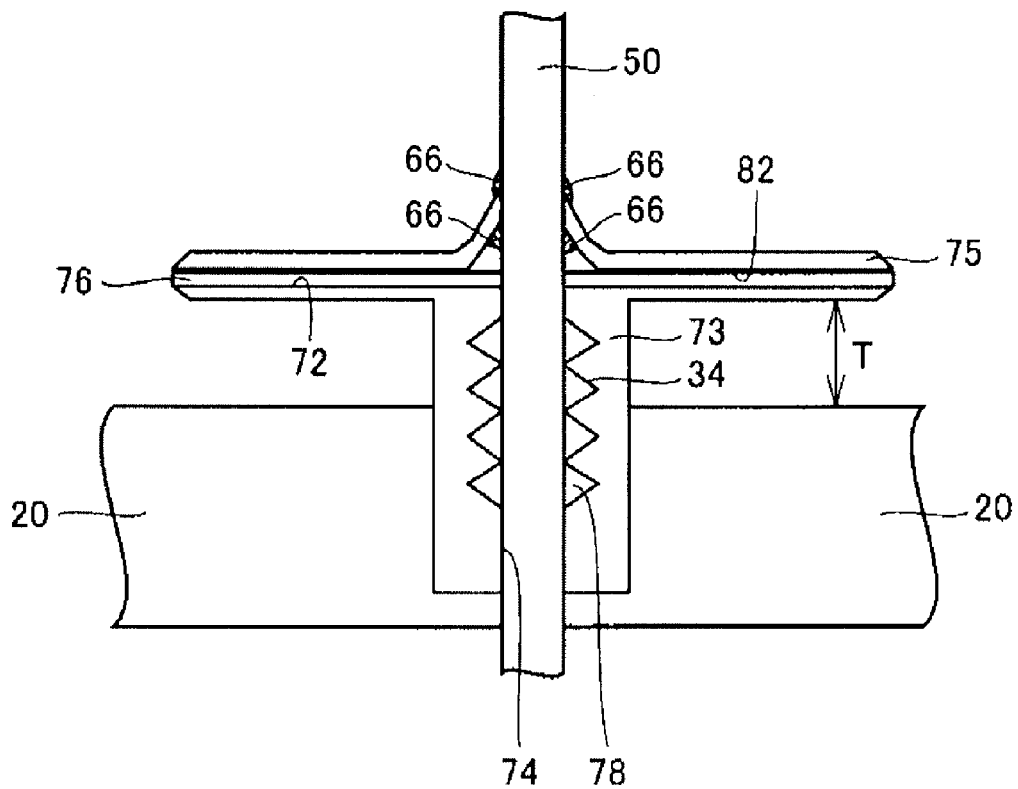
FIG. 10 is an enlarged diagram of the region A encircled by a broken line in FIG. 1 in Embodiment 7 of the present invention.

The superconducting apparatus in Embodiment 7 of the present invention is explained below. The apparatus includes a container for a superconducting apparatus. By referring to FIGS. 10 to 12, an explanation is given to the structure of the connecting portion in the container for a superconducting apparatus, the connecting portion being formed between the lead electrode 50 and the vacuum insulated container. FIG. 10 corresponds to FIG. 2.

The superconducting apparatus in Embodiment 7 of the present invention has basically the same structure as that of the superconducting apparatus shown in FIGS. 1 to 4. However, the structure of the connecting portion between the lead electrode 50 and the vacuum insulated containers 20 and 40 is different from the structure shown in FIGS. 2 and 3. In other words, as shown in FIG. 10, an opening is formed such that it passes through the vacuum insulated container 20 made of FRP. The opening is composed of a larger-diameter portion, which is located at the outer-surface side of the vacuum insulated container 20 and which has a relatively large width, and a smaller-diameter portion, which is located at the inner-surface side of the vacuum insulated container 20 and which has a width smaller than that of the larger-diameter portion. The smaller-diameter portion has a width (diameter) practically the same as that of the lead electrode 50. A housing-case-side fixing portion 73 made of FRP is inserted into and fixed to the larger-diameter portion. The housing-case-side fixing portion 73 may be bonded to the wall of the larger-diameter portion by using any bonding member such as adhesive.

The housing-case-side fixing portion 73 extends from the inside of the larger-diameter portion of the opening to a position above the outer surface of the vacuum insulated container 20 and has a resinous flange portion extending from the opening toward the outer side at the foregoing position. A through hole 74 is formed at the center portion of the housing-case-side fixing portion 73 such that it is directly in line with the smaller-diameter portion of the opening. A peak-and-trough portion 34, which has a screw structure, is formed on the wall of the through hole 74 in the housing-case-side fixing portion 73. The side face of the lead electrode 50 is provided with a screw structure portion 78 for mating with the peak-and-trough portion 34. By screwing the screw structure portion 78 of the lead electrode 50 into the peak-and-trough portion 34 in the through hole 74 of the housing-case-side fixing portion 73, the lead electrode 50 is connected to the housing-case-side fixing portion 73. Because the foregoing screw structure portion 78 is formed, the total volume of the lead electrode 50 is increased. Consequently, the total thermal capacity of the lead electrode 50 can be increased. In addition, because the contact surface area between the lead electrode 50 and the housing-case-side fixing portion 73 can be increased in comparison with the case where the screw structure portion 78 and the peak-and-trough portion 34 are not formed, the heat conduction between the lead electrode 50 and the housing-case-side fixing portion 73 can be performed more smoothly.

Furthermore, a metal-member-side fixing portion 75 is fixed to the lead electrode 50. The metal-member-side fixing portion 75 has a metallic flange portion placed in a position opposite to the resinous flange portion of the above-described housing-case-side fixing portion 73. The metal-member-side fixing portion 75 has the shape of a circle when viewed from above and is provided at its center portion with a hole into which the lead electrode 50 is to be inserted. Under the condition that the lead electrode 50 is inserted into the hole, the side face of the lead electrode 50 is connected and fixed hermetically to the metal-member-side fixing portion 75 (more specifically, to the wall of the foregoing hole or the surface portion adjacent to the hole of the metal-member-side fixing portion 75) through a bonding material 66 such as brazing or soldering filler metal. As the material of the bonding material 66, silver brazing filler metal containing silver (Ag), copper (Cu), zinc (Zn), and another element may be used, for example.

In the metal-member-side fixing portion 75, the region adjacent to the hole forms a curved portion whose cross section is curved as shown in FIG. 10. In other words, the region adjacent to the hole forms an elastically deformable portion. The forming of the above-described curved portion (or the elastically deformable portion) enables the absorption of the difference in the amount of thermal expansion (or contraction) between the vacuum insulated container 20 and the lead electrode 50. In addition, because the curved portion (or the elastically deformable portion) is brought into contact with the side face of the lead electrode 50 in a slant direction, the metal-member-side fixing portion 75 can be more easily connected to the lead electrode 50 through the bonding material 66.

The lead electrode 50 to which the metal-member-side fixing portion 75 is connected is inserted into and fixed to the through hole 74 of the housing-case-side fixing portion 73, which is fixed to the vacuum insulated container 20. At this moment, the metallic flange portion of the metal-member-side fixing portion 75 is placed such that it faces the resinous flange portion of the housing-case-side fixing portion 73. The metallic flange portion is connected and fixed with the resinous flange portion through a bonding member 76. As the bonding member 76, an epoxy resin-based adhesive or the like may be used. As the method for bonding the metallic flange portion with the resinous flange portion by using the bonding member 76, a method may be employed in which, for example, the bonding member 76 is placed (for example, applied) on a surface 72 of the resinous flange portion and subsequently the lead electrode 50 to which the metal-member-side fixing portion 75 is connected is inserted into the through hole 74 such that the metallic flange portion is placed precisely on the bonding member 76. Alternatively, in a container containing the bonding member 76 in a liquid state, the metallic flange portion may be bonded with the resinous flange portion under the condition that the metallic flange portion and the resinous flange portion are immersed in the bonding member 76.

Figure 11:
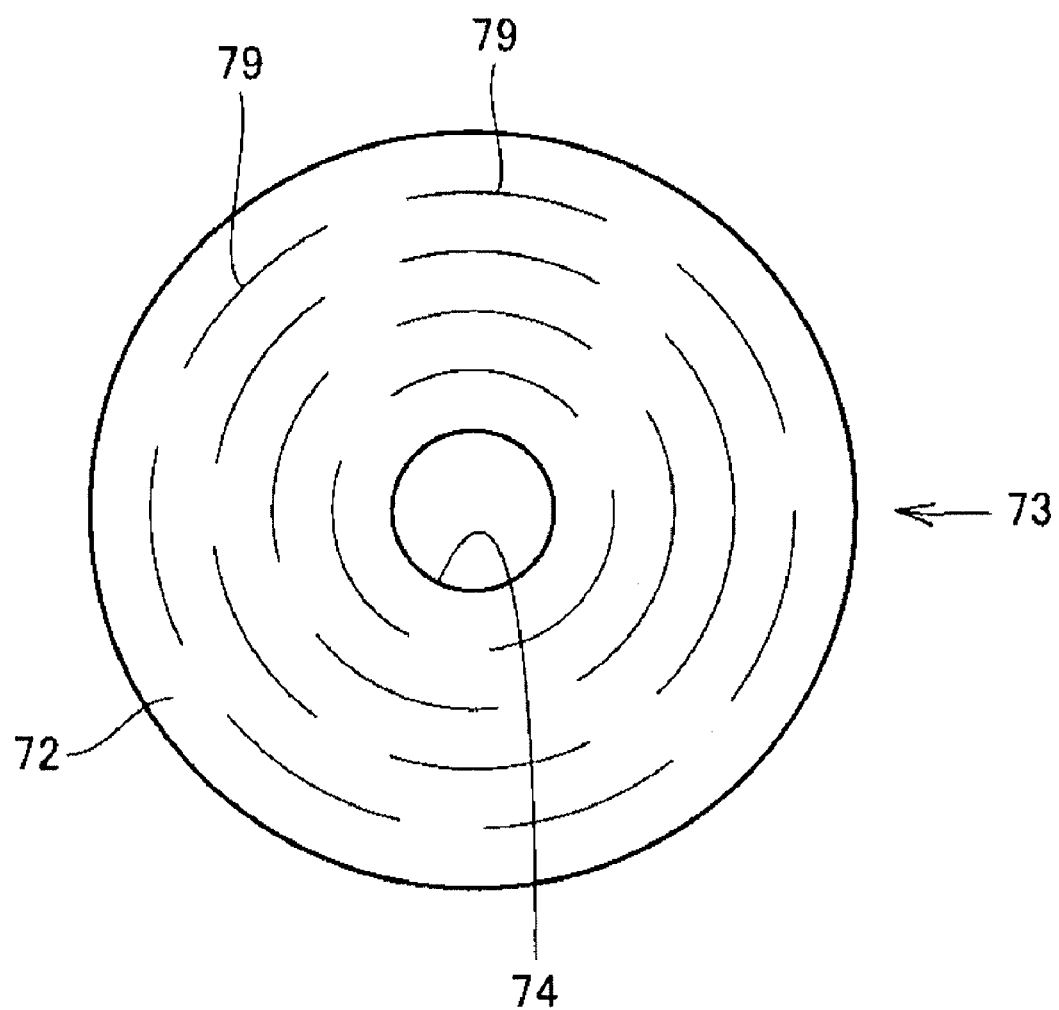
FIG. 11 is a schematic plan view showing the surface of the resinous flange portion shown in FIG. 10.
Figure 12:
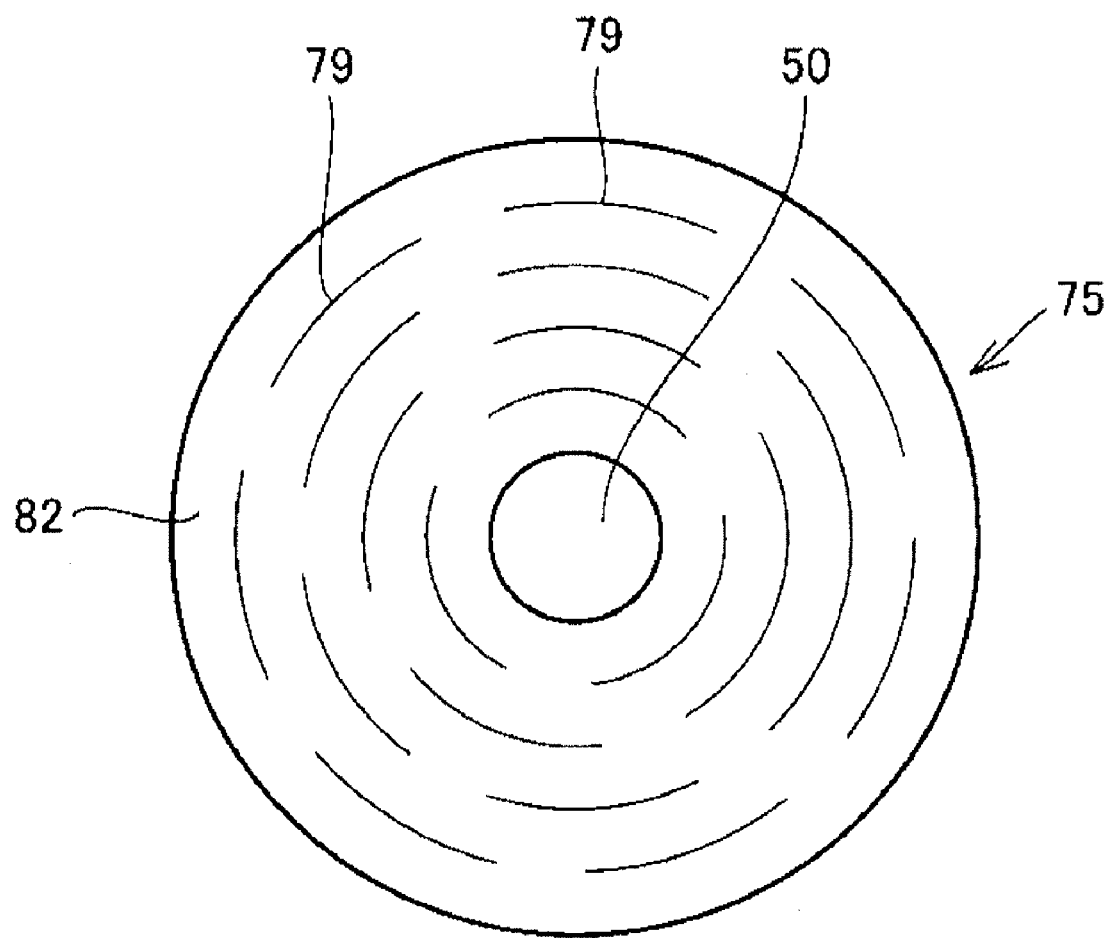
FIG. 12 is a schematic plan view showing the surface of the metallic flange portion shown in FIG. 10.

As shown in FIG. 11, on the surface 72 of the resinous flange portion of the housing-case-side fixing portion 73, the surface 72 being to be bonded with the bonding member 76, arc-shaped peak-and-trough portions 79 are formed in the shape of arcs of concentric circles with the through hole 74 being at the center (for example, formed as segments of concentric circles). As shown in FIG. 12, on a surface 82 of the metallic flange portion of the metal-member-side fixing portion 75, the surface 82 being to be bonded with the bonding member 76, arc-shaped peak-and-trough portions 79 are also formed in the shape of arcs of concentric circles with the lead electrode 50 being at the center (for example, formed as segments of concentric circles). The forming of the above-described arc-shaped peak-and-trough portions 79 can increase the surface area of the surfaces 72 and 82. When this design is employed, because the area of the bonding interface between the metallic flange portion and the bonding member 76 and between the resinous flange portion and the bonding member 76 can be increased, the bonding strength between the metallic flange portion and the resinous flange portion bonded through the bonding member 76 can be increased. In particular, in the case where the bonding member 76 is an adhesive made of resin, the bonding strength between the metallic flange portion and the bonding member 76 can be lower than the bonding strength between the resinous flange portion and the bonding member 76. For that reason, it is desirable that the above-described arc-shaped peak-and-trough portions 79 be formed at least on the surface 82 of the metallic flange portion. In addition, it is desirable that each of the arc-shaped peak-and-trough portions 79 be formed such that it extends along the circumference of the original circle with the through hole 74 or the lead electrode 50 being at the center. This configuration can effectively increase the length of the leakage path from the through hole 74, or the lead electrode 50, to the periphery of the metallic flange portion, or the resinous flange portion (the length of the leakage path is the creepage distance in the radial direction of the bonding interface between the surface 72 of the resinous flange portion or the surface 82 of the metallic flange portion and the bonding member 76). Although the arc-shaped peak-and-trough portions 79 may be formed as complete concentric circles, they may also be formed as segments of concentric circles when viewed from below or above as shown in FIGS. 11 and 12. It is undesirable to form each of the peak-and-trough portions 79 in such a way that it extends radially from the inner side to the outer side of the metallic flange portion (or the resinous flange portion). In other words, it is desirable that each of the arc-shaped peak-and-trough portions 79 be formed such that it extends only along the circumference of the original circle with the through hole 74, or the lead electrode 50, being at the center.

It is desirable that the housing-case-side fixing portion 73 be formed by using the same material as used for forming the vacuum insulated container 20, such as FRP. It is desirable that the metal-member-side fixing portion 75 be formed by using a material having a thermal expansion coefficient close to that of the material forming the housing-case-side fixing portion 73. For example, it is desirable that the material of the metal-member-side fixing portion 75 be selected such that the difference in thermal expansion coefficient between the material of the metal-member-side fixing portion 75 and the material forming the housing-case-side fixing portion 73 falls in the range of ±10% or less of the thermal expansion coefficient of the material forming the housing-case-side fixing portion 73, more desirably ±5% or less. More specifically, when FRP is used as the material of the housing-case-side fixing portion 73, Kovar may be used as the material of the metal-member-side fixing portion 75. When this design is employed, in particular, at the bonding interface between the metallic flange portion and the resinous flange portion (at the bonding portion formed by the bonding member 76), where cracks or the like is likely to develop, the difference in thermal expansion coefficient between the metallic flange portion and the resinous flange portion can be sufficiently decreased. Hence, this design can decrease the possibility of the development of cracks at the bonding interface.

The metallic flange portion may have a thickness of 0.01 mm or more and 5 mm or less, more desirably 0.1 mm or more and 1 mm or less. The reason why the foregoing numerical range is specified is that a relatively easily available plate material or film material has a thickness in the above-described range. The resinous flange portion may have a thickness of 0.01 mm or more and 5 mm or less, more desirably 0.2 mm or more and 2 mm or less. The reason why the foregoing numerical range is specified is that a relatively easily available plate material or film material has a thickness in the above-described range.

The outer diameter of the metallic flange portion of the metal-member-side fixing portion 75 (or the outer diameter of the resinous flange portion of the housing-case-side fixing portion 73) can be designed together with the above-described flange thickness such that the thermal stress in the flange-bonded portion does not exceed the bonding strength. The design can be conducted by taking into consideration the diameter of the lead electrode, the allowable space, the temperature of the cooling medium, and so on.

When the metallic flange portion is bonded with the resinous flange portion through the bonding member 76 as shown in FIG. 10, the bonding surface becomes a part of the sealing portion that isolates the inside of the vacuum insulated container 20 from the outside. By employing the foregoing structure in which the metallic flange portion is bonded with the resinous flange portion through the bonding member 76, when the thermal stress caused by the difference in temperature between the inside of the vacuum insulated container and the outside air is generated at the bonding portion between the metallic flange portion and the resinous flange portion, the thermal stress can be absorbed by a certain degree of elastic deformation of the metallic flange portion and the resinous flange portion (for example, by such an action as a bimetal).

It is desirable that the end face of the peripheral portion of the metallic flange portion and the resinous flange portion be processed to form a taper as shown in FIG. 10 (more specifically, at the end portion of the metallic flange portion and the resinous flange portion, an end face inclined toward the surface 72 or 82 is formed such that the thickness decreases as the position approaches the peripheral edge). The above processing can suppress the creation of a problem such as the breakage of the foregoing end portion resulting from the above-described thermal stress.

In the structure of the connecting portion between the vacuum insulated container 20 and the lead electrode 50 shown in FIGS. 10 to 12, the sealing portion taking on the responsibility of vacuum sealing (the bonding portion between the metallic flange portion and the resinous flange portion) is independent of the supporting portion in which the vacuum insulated container 20 mechanically supports the lead electrode 50 (the portion where the screw structure portion 78 of the lead electrode 50 mates with the peak-and-trough portion 34 in the through hole 74 of the housing-case-side fixing portion 73 to be mutually fixed). In consequence, at the time the supporting portion is subjected to a stress that may shift the relative position of the lead electrode 50 to the vacuum insulated container 20, even when cracks or the like develops at the supporting portion, the airtightness (the vacuum sealing) at the sealing portion can be maintained.

It is desirable that the distance T (see FIG. 10) from the outer surface of the vacuum insulated container 20 to the resinous flange portion be preset at a distance that can avoid direct contact even when the sealing portion is abruptly cooled.

Specific structures of the present invention are enumerated below, although the following description partly duplicates the above description on Embodiments.

According to the present invention, a container for a superconducting apparatus mounts in it the superconducting coil 60 as a member including a superconductor and is provided with:
 (a) the vacuum insulated containers 20 and 40, each of which is a housing case made of resin and provided with openings,
 (b) the lead electrodes 50 and the pipes 70, each of which is a metal member positioned such that it passes through the opening, and
 (c) connecting members, each of which covers the opening, connects the lead electrode 50 or the pipe 70 to the vacuum insulated container 20 or 40, and is provided with a thermal-stress-alleviating portion (each of the connecting members is the connecting member 12, 22, 32, 42, or 52, or the connecting member composed of the connecting members 63 and 65 or the connecting member composed of the metal-member-side fixing portion 75 and the housing-case-side fixing portion 73).

The above-described vacuum insulated containers 20 and 40 made of resin may be formed by using FRP, for example. The connecting member may have a curved portion as the thermal-stress-alleviating portion.

The following case is taken as an example. In the container for a superconducting apparatus, the above-described lead electrode 50 or pipe 70 is fixed to the vacuum insulated container 20 or 40 made of resin through the connecting member. In this container, the temperature at the inside of the vacuum insulated container 20 is reduced to the liquid nitrogen temperature, for example, in order to cool the superconducting coil 60. At this moment, because of the difference in thermal expansion coefficient between the material forming the vacuum insulated container 20 and the material forming the lead electrode 50 or the pipe 70, the amount of deformation caused by the temperature variation (the amount of thermal contraction) is different between the vacuum insulated container 20 and the lead electrode 50 or the pipe 70. In this case, when the lead electrode 50 or the pipe 70 is simply connected and fixed to the vacuum insulated container 20 through an adhesive or the like, separation or cracks may develop at the connecting portion between the vacuum insulated container 20 and the adhesive and between the adhesive and the lead electrode 50 or the pipe 70. On the other hand, in the case where the connecting member for connecting the lead electrode 50 or the pipe 70 to the vacuum insulated container 20 has a thermal-stress-alleviating portion (for example, the curved portion), which is a structure that absorbs the difference in the amount of thermal contraction between the lead electrode 50 or the pipe 70 and the vacuum insulated container 20, even when expansion (or contraction) occurs resulting from the temperature rise (or reduction) of the container for a superconducting apparatus, the difference in the amount of thermal expansion (or contraction) between the lead electrode 50 or the pipe 70 and the vacuum insulated container 20 is absorbed by the deformation of the thermal-stress-alleviating portion (in the above description, the term "connecting member" means the connecting member 12, 22, 32, 42, or 52, or the connecting member composed of the connecting members 63 and 65 or the connecting member composed of the metal-member-side fixing portion 75 and the housing-case-side fixing portion 73). The above-described configuration can suppress the creation of troubles such as separation and cracks caused by the thermal stress at the connecting portion where the lead electrode 50 or the pipe 70 is connected to the vacuum insulated container 20 and thereby enables the reliable connection of the lead electrode 50 or the pipe 70 to the vacuum insulated container 20.

In the above-described container for a superconducting apparatus, the connecting member composed of the first and second connecting members 63 and 65 shown in FIGS. 2 and 3 may have the first connecting member 63 as a housing-case-side fixing portion that is in contact with the wall of the opening and the second connecting member 65 as a metal-member-side fixing portion that has a width larger than that of the opening and that is provided with the curved portion. In the second connecting member 65, one end of the second connecting member 65 (the outer-periphery-side end portion) may be connected to the first connecting member 63 and the other end (the inner-periphery-side end portion) may be connected to the lead electrode 50 or the pipe 70, the other end being positioned at the opposite side through the medium of the curved portion.

In the above design, the width of the first connecting member 63 (that is, the width of the opening) can be smaller than that of the second connecting member 65. In other words, the width (diameter) of the opening formed in the vacuum insulated containers 20 and 40 can be set to be small without regard to the structure of the curved portion (the structure of the second connecting member 65). In consequence, the entrance and exit of the heat through the opening can be more suppressed than the case where the opening has a large diameter.

In the above-described container for a superconducting apparatus, it is desirable that the connecting members 12, 22, 32, 42, 52, 63, and 65 and the metal-member-side fixing portion 75 shown in FIG. 10 have a thermal expansion coefficient at most two times that of the resin forming the vacuum insulated containers 20 and 40. In other words, when the thermal expansion coefficient of the connecting members 12, 22, 32, 42, 52, 63, and 65 and the metal-member-side fixing portion 75 shown in FIG. 10 has a small difference from the thermal expansion coefficient of the resin forming the vacuum insulated containers 20 and 40, the thermal stress caused by the difference in thermal expansion coefficient can be suppressed from concentrating at the connecting portion where the connecting members 12, 22, 32, 42, and 52, and the connecting member composed of the connecting members 63 and 65 and the connecting member composed of the metal-member-side fixing portion 75 and the housing-case-side fixing portion 73 are each connected to the vacuum insulated containers 20 and 40. As a result, the possibility that the connecting portion breaks by the action of the thermal stress can be decreased. Consequently, the lead electrode 50 or the pipe 70 can be more reliably connected to the vacuum insulated containers 20 and 40.

In the above-described container for a superconducting apparatus, it is desirable that the connecting members 12, 22, 32, 42, 52, 63, and 65 and the metal-member-side fixing portion 75 shown in FIG. 10 be composed of Fe—Ni alloy. In addition, it is desirable that the resin forming the vacuum insulated containers 20 and 40 be FRP. An Fe—Ni alloy, which is an alloy of iron (Fe) and nickel (Ni), has a small difference in thermal expansion coefficient from resin (in particular, FRP). Consequently, it is desirable to use the Fe—Ni alloy as a material for forming the connecting members 12, 22, 32, 42, 52, 63, and 65 and the metal-member-side fixing portion 75 shown in FIG. 10.

In the above-described container for a superconducting apparatus, as shown in FIG. 10, the connecting member may include:

(a) a housing-case-side fixing portion 73 that is made of resin and that is in contact with the wall of the opening, and (b) a metal-member-side fixing portion 75 that is made of metal and that is connected to the lead electrode 50 or the pipe 70 as the metal member.

The housing-case-side fixing portion 73 may have a resinous flange portion extending toward the outer side from the opening at a position above the outer surface of the vacuum insulated containers 20 and 40 as the housing case. The metal-member-side fixing portion 75 may have a metallic flange portion placed in a position opposite to the resinous flange portion. The metallic flange portion may be bonded with the resinous flange portion through the bonding member 76. The thermal-stress-alleviating portion may include a bonding portion between the metallic flange portion and the resinous flange portion. In addition, the curved portion may be placed between the connecting portion where the metal-member-side fixing portion 75 is connected to the lead electrode 50 or the pipe 70 (the inner-periphery-side end portion connected to the lead electrode 50 in FIG. 10) and the metallic flange portion.

In the above case, because the portion where the metallic flange portion is connected and fixed with the resinous flange portion through the bonding member 76 becomes a vacuum-sealing portion, a vacuum-sealing portion having a large area can be formed in which two flange portions face each other. In addition, both the metallic flange portion and the resinous flange portion can have a thickness that enables the flange portions to elastically deform themselves in order to alleviate the thermal stress. In consequence, the elastic deformation of the flange portions can alleviate the thermal stress.

A container of the present invention for a superconducting apparatus mounts in it the superconducting coil 60, which is a member including a superconductor, and is provided with:
- (a) the vacuum insulated containers 20 and 40, each of which is a housing case made of resin and provided with an opening,
- (b) the lead electrode 50 and the pipe 70, each of which is a metal member positioned such that it passes through the opening, and
- (c) connecting members, each of which covers the opening, connects the lead electrode 50 or the pipe 70 to the vacuum insulated container 20 or 40, and includes an elastically deformable portion (a curved portion) made of metal (each of the connecting members is the connecting member 12, 22, 32, 42, or 52, or the connecting member composed of the connecting members 63 and 65 or the connecting member composed of the metal-member-side fixing portion 75 and the housing-case-side fixing portion 73).

The following case is taken as an example. In the foregoing container for a superconducting apparatus, the temperature at the inside of the vacuum insulated containers 20 and 40 is reduced to the liquid nitrogen temperature, for example, in order to cool the superconductor. At this moment, because of the difference in thermal expansion coefficient between the material forming the vacuum insulated containers 20 and 40 and the material forming the lead electrode 50 or the pipe 70, the amount of deformation caused by the temperature variation (the amount of thermal contraction) of the vacuum insulated containers 20 and 40 differs from that of the lead electrode 50 or the pipe 70. In this case, when the lead electrode 50 or the pipe 70 is simply connected and fixed to the vacuum insulated containers 20 and 40 through an adhesive or the like, separation or cracks may develop at the connecting portion between the adhesive and the vacuum insulated containers 20 and 40 and between the adhesive and the lead electrode 50 or the pipe 70. On the other hand, in the container of the present invention for a superconducting apparatus, the connecting member for connecting the lead electrode 50 or the pipe 70 to the vacuum insulated containers 20 and 40 has an elastically deformable portion made of metal, which is a structure that absorbs the difference in the amount of thermal contraction between the lead electrode 50 or the pipe 70 and the vacuum insulated containers 20 and 40. Consequently, even when expansion (or contraction) occurs resulting from the temperature rise (or reduction) of the container for a superconducting apparatus, the difference in the amount of thermal expansion (or contraction) between the lead electrode 50 or the pipe 70 and the vacuum insulated containers 20 and 40 is absorbed by the elastic deformation of the elastically deformable portion. The above-described configuration can suppress the creation of troubles such as separation and cracks caused by the thermal stress at the connecting portion where the lead electrode 50 or the pipe 70 is connected to the vacuum insulated containers 20 and 40 and thereby enables the reliable connection of the lead electrode 50 or the pipe 70 to the vacuum insulated containers 20 and 40.

In the above-described container for a superconducting apparatus, the connecting members 63 and 65 may have the first connecting member 63 as a housing-case-side fixing portion that is in contact with the wall of the opening and the second connecting member 65 as a metal-member-side fixing portion that has a width larger than that of the opening and that is provided with the elastically deformable portion. In the second connecting member 65, one end of the second connecting member 65 may be connected to the first connecting member 63 and the other end may be connected to the lead electrode 50 or the pipe 70, the other end being positioned at the opposite side through the medium of the elastically deformable portion (the curved portion).

In the above design, the width of the first connecting member 63 (that is, the width of the opening) can be smaller than that of the second connecting member 65. In other words, the width (diameter) of the opening formed in the vacuum insulated containers 20 and 40 can be set to be small without regard to the structure of the second connecting member 65. In consequence, the entrance and exit of the heat through the opening can be more suppressed than the case where the opening has a large diameter.

In the above-described container for a superconducting apparatus, as shown in FIG. 10, the connecting member may include:
- (a) a housing-case-side fixing portion 73 that is made of resin and that is in contact with the wall of the opening, and
- (b) a metal-member-side fixing portion 75 that is made of metal, that has the elastically deformable portion, and that is connected to the lead electrode 50 or the pipe 70 as the metal member.

The housing-case-side fixing portion 73 may have a resinous flange portion extending toward the outer side from the opening at a position above the outer surface of the vacuum insulated containers 20 and 40 as the housing case. The metal-member-side fixing portion 75 may have a metallic flange portion placed in a position opposite to the resinous flange portion. The metallic flange portion may be bonded with the resinous flange portion through the bonding member 76. The elastically deformable portion may include a bonding portion between the metallic flange portion and the resinous flange portion. In addition, the elastically deformable portion may be placed between the connecting portion where the metal-member-side fixing portion 75 is connected to the lead electrode 50 or the pipe 70 (the inner-periphery-side end portion connected to the lead electrode 50 in FIG. 10) and the metallic flange portion. Furthermore, the metallic flange portion itself may function as the elastically deformable portion by having a sufficiently thin thickness.

In the above case, because the portion where the metallic flange portion is connected and fixed with the resinous flange portion through the bonding member 76 becomes a vacuum-sealing portion, a vacuum-sealing portion having a large area can be formed in which two flange portions face each other. In addition, both the metallic flange portion and the resinous flange portion can have a thickness that enables the flange portions to elastically deform themselves in order to alleviate the thermal stress. In consequence, the elastic deformation of the flange portions can alleviate the thermal stress.

A container of the present invention for a superconducting apparatus mounts in it the superconducting coil 60, which is a member including a superconductor, and is provided with:
- (a) the vacuum insulated containers 20 and 40, each of which is a housing case made of resin and provided with an opening,
- (b) the lead electrode 50 and the pipe 70, each of which is a metal member positioned such that it passes through the opening, and
- (c) connecting members, each of which covers the opening and connects the lead electrode 50 or the pipe 70 to the vacuum insulated container 20 or 40 (each connecting member is composed of the metal-member-side fixing portion 75 and the housing-case-side fixing portion 73).

Each of the connecting members may include:
(a) a housing-case-side fixing portion 73 that is made of resin and that is in contact with the wall of the opening, and
(b) a metal-member-side fixing portion 75 that is made of metal and that is connected to the lead electrode 50 or the pipe 70 as the metal member.

The housing-case-side fixing portion 73 may have a resinous flange portion extending toward the outer side from the opening at a position above the outer surface of the vacuum insulated containers 20 and 40 as the housing case. The metal-member-side fixing portion may have a metallic flange portion placed in a position opposite to the resinous flange portion. The metallic flange portion may be bonded with the resinous flange portion through the bonding member 76. An elastically deformable portion (for example, a curved portion having a curved cross section) may be placed between the connecting portion where the metal-member-side fixing portion 75 is connected to the lead electrode 50 or the pipe 70 (the inner-periphery-side end portion connected to the lead electrode 50 in FIG. 10) and the metallic flange portion. Furthermore, the metallic flange portion itself may function as the elastically deformable portion by having a sufficiently thin thickness. The resinous flange portion may be placed at a predetermined distance T (see FIG. 10) from the outer surface of the vacuum insulated containers 20 and 40. In other words, a gap may be formed between the resinous flange portion and the outer surface of the vacuum insulated containers 20 and 40.

In the above-described container for a superconducting apparatus, as shown in FIG. 12, in the metallic flange portion, on the surface 82 in contact with the bonding member 76 (see FIG. 10), arc-shaped peak-and-trough portions 79 may be formed such that they each extend along the circumference of the circle whose center is the center of the connecting portion where the metallic flange portion is connected with the lead electrode 50 (or the pipe 70) as the metal member. The forming of the above-described peak-and-trough portions 79 can increase the area of the bonding interface between the metallic flange portion and the bonding member 76.

In the above-described container for a superconducting apparatus, as shown in FIG. 10, the housing-case-side fixing portion 73 may be provided with a through hole 74 positioned at the inside of the opening of the vacuum insulated containers 20 and 40 as the housing case. The lead electrode 50 or the pipe 70 as the metal member may be inserted into the through hole 74. The through hole 74 may be provided with a peak-and-trough portion 34 at its inner surface. The lead electrode 50 or the pipe 70 may be provided with a screw structure portion 78 at its outer surface. The lead electrode 50 or the pipe 70 may be fixed to the housing-case-side fixing portion 73 by mating the screw structure portion 78 with the peak-and-trough portion 34. When this structure is employed, the lead electrode 50 or the pipe 70 can be easily fixed to the connecting member (the housing-case-side fixing portion 73) through the screw structure. In addition, because the contact area between the housing-case-side fixing portion 73 and the lead electrode 50 or the pipe 70 can be increased in comparison with the case where the screw structure portion 78 and the peak-and-trough portion 34 are not formed, the heat conduction between the housing-case-side fixing portion 73 and the lead electrode 50 or the pipe 70 can be performed more smoothly.

A superconducting apparatus of the present invention is provided with:

(a) the above-described container for a superconducting apparatus, and
(b) the superconducting coil 60 that is interpreted as a member including a superconductor and that is mounted in the container for a superconducting apparatus.

The above configuration can suppress the development of cracks and the like at the portion of the vacuum insulated containers 20 and 40 (the opening) through which the lead electrode 50 or the pipe 70 passes, thereby enabling the realization of a superconducting apparatus having high reliability.

Embodiments of the present invention are explained in the above. It is to be considered that the above-disclosed embodiments are illustrative and not restrictive in all respects. The scope of the present invention is shown by the scope of the appended claims. Accordingly, the present invention is intended to cover all revisions and modifications included within the meaning and scope equivalent to the scope of the claims.

INDUSTRIAL APPLICABILITY

The present invention is excellent as a technique that enhances the airtightness of the superconducting apparatus against the outside.

REFERENCE SIGNS LIST

10: container's inside space
12, 22, 32, 42, and 52: connecting member
14, 24, and 64: curved portion's end
16, 26, 36, 46, 56, and 66: bonding material
17, 27, 37, 47, and 67: gap
20 and 40: vacuum insulated container
21: fixing member
28: flange portion
30: vacuum insulated bath
34: peak-and-trough portion
44: connecting region
48: upper curved portion's connecting region
50: lead electrode
58: upper connecting region
60: superconducting coil
63: first connecting member
65: second connecting member
70: pipe
72 and 82: surface
73: housing-case-side fixing portion
74: through hole
75: metal-member-side fixing portion
76: bonding member
78: screw structure portion
79: peak-and-trough portion

CITATION LIST

Patent Literature

Patent literature 1: the published Japanese patent application Tokukai 2008-218861.

The invention claimed is:
1. A container for a superconducting apparatus, the container mounting in it a member including a superconductor and comprising:
(a) a housing case made of resin and provided with an opening;

(b) a metal member positioned such that it passes through the opening; and
(c) a connecting member that covers the opening, that connects the metal member to the housing case, and that is provided with a thermal-stress-alleviating portion,
wherein the connecting member is provided with a curved portion as the thermal-stress-alleviating portion.

2. The container for a superconducting apparatus as defined by claim 1, wherein the connecting member comprises:
(a) a housing-case-side fixing portion that is in contact with the wall of the opening; and
(b) a metal-member-side fixing portion that has a width larger than that of the opening and that is provided with the curved portion;
wherein in the metal-member-side fixing portion, one end of the metal-member-side fixing portion is connected to the housing-case-side fixing portion and the other end is connected to the metal member, the other end being positioned at the opposite side through the medium of the curved portion.

3. The container for a superconducting apparatus as defined by claim 2, wherein the connecting member is composed of Fe—Ni alloy.

4. A container for a superconducting apparatus, the container mounting in it a member including a superconductor and comprising:
(a) a housing case made of resin and provided with an opening;
(b) a metal member positioned such that it passes through the opening; and
(c) a connecting member that covers the opening, that connects the metal member to the housing case, and that is provided with a thermal-stress-alleviating portion,
wherein:
(a) the connecting member comprises:
(a1) a housing-case-side fixing portion that is made of resin and that is in contact with the wall of the opening; and
(a2) a metal-member-side fixing portion that is made of metal and that is connected to the metal member;
(b) the housing-case-side fixing portion has a resinous flange portion extending toward the outer side from the opening at a position above the outer surface of the housing case;
(c) the metal-member-side fixing portion has a metallic flange portion placed in a position opposite to the resinous flange portion;
(d) the metallic flange portion is bonded with the resinous flange portion through a bonding member; and
(e) the thermal-stress-alleviating portion includes a bonding portion between the metallic flange portion and the resinous flange portion.

5. A container for a superconducting apparatus, the container mounting in it a member including a superconductor and comprising:
(a) a housing case made of resin and provided with an opening;
(b) a metal member positioned such that it passes through the opening; and
(c) a connecting member that covers the opening, that connects the metal member to the housing case, and that includes an elastically deformable portion made of metal,
wherein the connecting member comprises:
(a) a housing-case-side fixing portion that is in contact with the wall of the opening; and
(b) a metal-member-side fixing portion that has a width larger than that of the opening and that is provided with the elastically deformable portion;
wherein in the metal-member-side fixing portion, one end of the metal-member-side fixing portion is connected to the housing-case-side fixing portion and the other end is connected to the metal member, the other end being positioned at the opposite side through the medium of the elastically deformable portion.

6. A container for a superconducting apparatus, the container mounting in it a member including a superconductor and comprising:
(a) a housing case made of resin and provided with an opening;
(b) a metal member positioned such that it passes through the opening; and
(c) a connecting member that covers the opening, that connects the metal member to the housing case, and that includes an elastically deformable portion made of metal,
wherein:
(a) the connecting member comprises:
(a1) a housing-case-side fixing portion that is made of resin and that is in contact with the wall of the opening; and
(a2) a metal-member-side fixing portion that is made of metal, that has the elastically deformable portion, and that is connected to the metal member;
(b) the housing-case-side fixing portion has a resinous flange portion extending toward the outer side from the opening at a position above the outer surface of the housing case;
(c) the metal-member-side fixing portion has a metallic flange portion placed in a position opposite to the resinous flange portion;
(d) the metallic flange portion is bonded with the resinous flange portion through a bonding member; and
(e) the elastically deformable portion includes a bonding portion between the metallic flange portion and the resinous flange portion.

7. The container for a superconducting apparatus as defined by claim 4, wherein in the metallic flange portion, on the surface in contact with the bonding member, an arc-shaped peak-and-trough portion is formed such that it extends along the circumference of a circle whose center is the center of the connecting portion where the metallic flange portion is connected with the metal member.

8. The container for a superconducting apparatus as defined by claim 4, wherein:
(a) the housing-case-side fixing portion is provided with a through hole positioned at the inside of the opening of the housing case;
(b) the metal member is inserted into the through hole;
(c) the through hole is provided with an internal thread at its inner surface;
(d) the metal member is provided with an external thread at its outer surface; and
(e) the external thread is mated with the internal thread, so that the metal member is fixed to the housing-case-side fixing portion.

9. A superconducting apparatus, comprising:
(a) the container for a superconducting apparatus as defined by claim 1; and
(b) a member that includes a superconductor and that is mounted in the container for a superconducting apparatus.

10. The container for a superconducting apparatus as defined by claim 6, wherein in the metallic flange portion, on the surface in contact with the bonding member, an arc-shaped peak-and-trough portion is formed such that it extends along the circumference of a circle whose center is the center of the connecting portion where the metallic flange portion is connected with the metal member.

11. The container for a superconducting apparatus as defined by claim 6, wherein:
   (a) the housing-case-side fixing portion is provided with a through hole positioned at the inside of the opening of the housing case;
   (b) the metal member is inserted into the through hole;
   (c) the through hole is provided with an internal thread at its inner surface;
   (d) the metal member is provided with an external thread at its outer surface; and
   (e) the external thread is mated with the internal thread, so that the metal member is fixed to the housing-case-side fixing portion.

12. The container for a superconducting apparatus as defined by claim 7, wherein:
   (a) the housing-case-side fixing portion is provided with a through hole positioned at the inside of the opening of the housing case;
   (b) the metal member is inserted into the through hole;
   (c) the through hole is provided with an internal thread at its inner surface;
   (d) the metal member is provided with an external thread at its outer surface; and
   (e) the external thread is mated with the internal thread, so that the metal member is fixed to the housing-case-side fixing portion.

13. A superconducting apparatus, comprising:
   (a) the container for a superconducting apparatus as defined by claim 5; and
   (b) a member that includes a superconductor and that is mounted in the container for a superconducting apparatus.

14. A container for a superconducting apparatus, the container mounting in it a member including a superconductor and comprising:
   (a) a housing case made of resin and provided with an opening;
   (b) a metal member positioned such that it passes through the opening; and
   (c) a connecting member that covers the opening, that connects the metal member to the housing case, and that is provided with a thermal-stress-alleviating portion, wherein
      (c-1) the connecting member comprises a metal-member-side fixing portion,
      (c-2) the connecting member comprises a housing-case-side fixing portion that is made of resin.

15. The container for a superconducting apparatus as defined in claim 14, wherein the housing-case-side fixing portion be formed by using the same material as used for forming the housing case.

16. A container for a superconducting apparatus, the container mounting in it a member including a superconductor and comprising:
   (a) a housing case made of resin and provided with an opening;
   (b) a metal member positioned such that it passes through the opening; and
   (c) a connecting member that covers the opening, that connects the metal member to the housing case, and that is provided with a thermal-stress-alleviating portion, wherein
   (d) the connecting member comprises:
      (d1) a housing-case-side fixing portion that is made of resin and that is in contact with the wall of the opening; and
      (d2) a metal-member-side fixing portion that is made of metal and that is connected to the metal member;
   (e) the housing-case-side fixing portion has a resinous thin portion extending toward the outer side from the opening at a position above the outer surface of the housing case;
   (f) the metal-member-side fixing portion has a metallic thin portion placed in a position opposite to the resinous thin portion;
   (g) the metallic thin portion is bonded with the resinous thin portion through a bonding member; and
   (h) the thermal-stress-alleviating portion includes a bonding portion between the metallic thin portion and the resinous thin portion.

* * * * *